(12) United States Patent
Miller et al.

(10) Patent No.: US 12,314,031 B1
(45) Date of Patent: May 27, 2025

(54) INCORPORATING COMPLEX GEOMETRIC FEATURES IN ADDITIVELY MANUFACTURED PARTS

(71) Applicant: DIVERGENT TECHNOLOGIES, INC., Los Angeles, CA (US)

(72) Inventors: Samuel Noah Miller, Los Angeles, CA (US); Matthew Cooper Keller, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 297 days.

(21) Appl. No.: 16/918,955

(22) Filed: Jul. 1, 2020

Related U.S. Application Data

(63) Continuation of application No. 16/915,692, filed on Jun. 29, 2020, now abandoned.

(60) Provisional application No. 62/867,713, filed on Jun. 27, 2019.

(51) Int. Cl.
| | | |
|---|---|---|
| *G05B 19/4099* | (2006.01) | |
| *B22F 10/10* | (2021.01) | |
| *B29C 64/153* | (2017.01) | |
| *B29C 64/393* | (2017.01) | |
| *B33Y 50/00* | (2015.01) | |
| *B33Y 50/02* | (2015.01) | |

(52) U.S. Cl.
CPC .......... *G05B 19/4099* (2013.01); *B22F 10/10* (2021.01); *B29C 64/153* (2017.08); *B29C 64/393* (2017.08); *B33Y 50/00* (2014.12); *B33Y 50/02* (2014.12); *G05B 2219/35134* (2013.01)

(58) Field of Classification Search
USPC .......................................................... 700/98
See application file for complete search history.

(56) References Cited

U.S. PATENT DOCUMENTS

| | | | |
|---|---|---|---|
| 5,203,226 | A | 4/1993 | Hongou et al. |
| 5,742,385 | A | 4/1998 | Champa |
| 5,990,444 | A | 11/1999 | Costin |
| 6,010,155 | A | 1/2000 | Rinehart |
| 6,096,249 | A | 8/2000 | Yamaguchi |
| 6,140,602 | A | 10/2000 | Costin |
| 6,250,533 | B1 | 6/2001 | Otterbein et al. |

(Continued)

FOREIGN PATENT DOCUMENTS

| | | |
|---|---|---|
| WO | 1996036455 A1 | 11/1996 |
| WO | 1996036525 A1 | 11/1996 |

(Continued)

OTHER PUBLICATIONS

US 9,202,136 B2, 12/2015, Schmidt et al. (withdrawn)
US 9,809,265 B2, 11/2017, Kinjo (withdrawn)
US 10,449,880 B2, 10/2019, Mizobata et al. (withdrawn)

*Primary Examiner* — Mohammad Ali
*Assistant Examiner* — Joshua T Sanders
(74) *Attorney, Agent, or Firm* — ArentFox Schiff, LLP

(57) ABSTRACT

Techniques for modeling a part with a complex geometric feature (CGF) for use with a three-dimension (3-D) printer are disclosed. In one aspect of the disclosure, a method of modeling a part for 3-D printing includes determining a first volume of the part. The first volume may be modeled using a 3-D computer-aided design (CAD) model. A second volume of the part is determined. The CGF may be modeled within the second volume using parametric modeling based on 3-D printing parameters.

26 Claims, 16 Drawing Sheets

(56) References Cited

U.S. PATENT DOCUMENTS

| | | |
|---|---|---|
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |

(56) References Cited

U.S. PATENT DOCUMENTS

| | | |
|---|---|---|
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |

(56) References Cited

U.S. PATENT DOCUMENTS

| | | |
|---|---|---|
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2001/0025203 A1* | 9/2001 | Gervasi .................. G06T 19/00 700/98 |
| 2006/0108783 A1 | 5/2006 | Ni et al. |
| 2014/0277669 A1 | 9/2014 | Nardi et al. |
| 2016/0133049 A1* | 5/2016 | Hill ........................ G06T 19/20 700/98 |
| 2017/0113344 A1 | 4/2017 | Schönberg |
| 2017/0341309 A1 | 11/2017 | Piepenbrock et al. |
| 2018/0186092 A1* | 7/2018 | Nordback ............... B33Y 50/02 |
| 2019/0021186 A1* | 1/2019 | Poltorak ............. H01L 21/4871 |
| 2019/0047047 A1* | 2/2019 | Mark ..................... B22F 10/16 |
| 2019/0091770 A1* | 3/2019 | Balanica ............ G05B 19/4097 |
| 2019/0091988 A1* | 3/2019 | Das ........................ B33Y 10/00 |
| 2021/0229363 A1* | 7/2021 | Bauereiss ............ B29C 64/153 |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | WO-2016081496 A1 * | 5/2016 ........... B29C 64/106 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

* cited by examiner

INCORPORATING COMPLEX GEOMETRIC FEATURES IN ADDITIVELY MANUFACTURED PARTS

CROSS-REFERENCE TO RELATED APPLICATIONS

This application is a continuation of U.S. patent application Ser. No. 16/915,692, entitled Incorporating Complex Geometric Features In Additively Manufactured Parts, filed Jun. 29, 2020, and claims the benefit of, and right of priority to, U.S. Provisional Patent Application No. 62/867,713, entitled Incorporating Complex Geometric Features In Additively Manufactured Parts, filed Jun. 27, 2019, the contents of both of which are expressly incorporated by reference as if fully set forth herein.

BACKGROUND

Field

The present disclosure relates generally to additive manufacturing (AM), and more specifically to producing complex geometric features using AM.

Background

AM (or three-dimensional (3-D) printing) continues to be adopted as an increasingly viable alternative to conventional machining techniques for producing non-design specific parts. The proliferation of AM technologies has allowed manufacturers to generate structures with more complex geometries. Possible examples of these geometries may include custom lattices, complex support structures for use during 3-D printing, and parts with redundant geometrical features. The latter may include a part such as a heat exchanger or similar structure that can incorporate periodic or semi-periodic patterns of walls, tubes, fins, or other elements, for example.

As these parts become more complex to accommodate increasingly sophisticated applications in high tech, automotive, aerospace and other blossoming industries, the overall AM process flow has become more computationally intensive. Substantial new processing and storage bottlenecks have recently surfaced and are currently being addressed. These bottlenecks include, among others, prohibitively large file sizes of the computer-based models to be printed, which can introduce long printing delays and print errors that can require wholesale redesigns of these parts.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect of the disclosure, a method of modeling a part for 3-D printing includes determining a first volume of the part, modeling the first volume using a 3-D computer-aided design (CAD) model, determining a second volume of the part; and modeling a complex geometric feature (CGF) within the second volume using parametric modeling based on 3-D printing parameters.

In another aspect of the disclosure, a non-transitory computer readable storage medium has data stored therein representing instructions executable by a processing system for modeling a part for 3-D printing. The instructions include code for determining a first volume of the part, modeling the first volume using a 3-D computer-aided design (CAD) model, determining a second volume of the part, and modeling a complex geometric feature (CGF) within the second volume using parametric modeling based on 3-D printing parameters.

It is understood that other aspects of parametric modeling will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

DETAILED DESCRIPTION

Figure 1A:
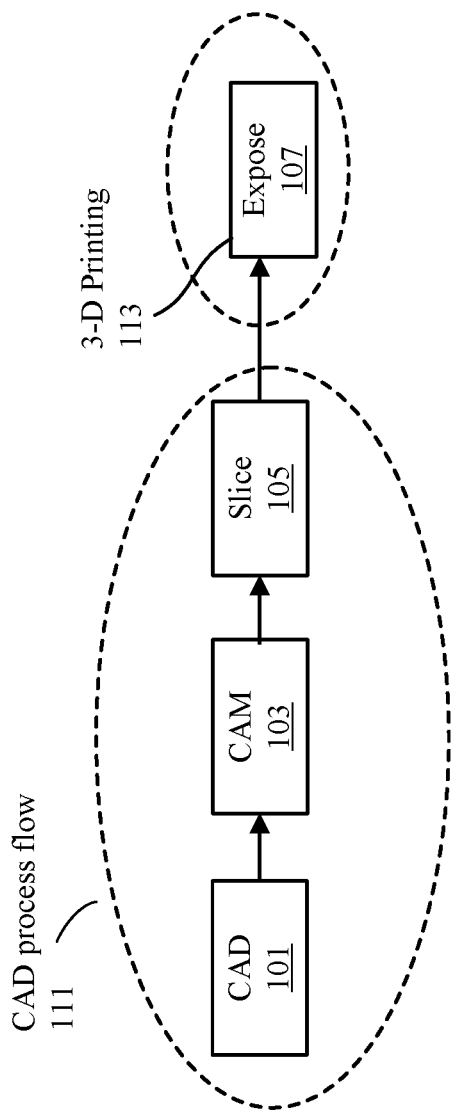
FIG. 1A is a flow diagram illustrating a sequence of steps involved in the AM process including a parametric-based expose technique.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

In various aspects of the disclosure, an exposure pattern for CGFs may include one or more parametric parameters defined by instructions and used directly on cross-sectional layers within a determined volume at the printer. The parametric instructions manipulate the energy beam (e.g., laser, electron beam, electric arc, etc.) in the 3-D printer. In an embodiment, the manipulation of the energy beam is conducted in the volume to selectively fuse material in each consecutive print layer of a consecutive set of print layers. The objective of the exposure pattern is to manipulate the laser directly during the exposure period to create 2-D representations on consecutive layers that, when combined, form complex lattices and other geometrically complex structures in the volume determined in the CAD file. The volume may be identified in the CAD file as a solid body or another simple structure. This technique can be performed without having to model the parametrically-produced structure in three dimensions, or to compile the models into further instructions. Parametric modeling allows complex structures to be quickly printed, optionally in or near real-time. Parametric modeling can also be changed after the print job has begun, and can be conducted with minimal potential for error as compared with 3-D printing based on standard CAD modeling, which is slower for complex structures and more prone to error.

In addition to the challenges that potentially lead to errors at the printing stage, the manufacturer may recognize a number of missed opportunities when initially developing the CAD model. For example, after reviewing a complex CAD model recently completed after a period of weeks of effort, a design engineer may subsequently realize in retrospect that specific modifications to the design may have been more appropriate or may have solved other problems along the way. More often than not, however, the manufacturer is not willing to begin again and thereby forego the time it took to design the initial product, simply to optimize the geometry of some lattice or other CGF, for example. It is these types of dilemmas that lend additional value to the parametric approach.

The printing of parts using a 3-D printer conventionally begins with modeling the structure using CAD to produce a CAD model. A CAD model is a computer model of a 3-D part. The CAD model may be produced using one of many commercially available (or proprietary) CAD applications. A CAD application may include the necessary software tools to enable a designer to create a detailed representation of a 3-D part to be printed. The CAD model may include a single data file that includes all the information necessary for a 3-D printer to render the part. Alternatively, the CAD model may include more than one file. The CAD model may also be linked to other files or libraries in some examples. For purposes of this disclosure a "CAD file" can mean, where appropriate in the context, a plurality of CAD files representing a 3-D part.

CAD files may be exported for 3-D printing. An example of CAD files used for 3-D printing includes STL files. Another example of a program for modeling a 3-D part is G-code. One type of CAD model can be converted into G-code, which in turn can be used by a 3-D printer to print the modeled structure. A number of different file formats may be used for 3-D printing purposes. In general, 3-D printers can read coordinates from a CAD model, can compile the CAD model and convert those coordinates into instructions, and can then move a print head or control the switching of an energy beam using the instructions to print the part. For purposes of this disclosure, CAD files are broadly defined to include these different versions and compilations of the CAD model.

The more complex the structure to be printed, the larger the typical file size of the CAD design model, and the more man-hours that will likely be invested in the overall design process. As parts become more geometrically complex to perform increasingly sophisticated applications for different technologies, CAD modeling has been adversely affected. For example, CAD file sizes have continued to increase into the multiple-gigabyte ranges and greater. Often, the increases in these file sizes are due to structures that have large numbers of redundant or partially redundant geometrical patterns. In the CAD model, each of these individual redundant structures may be represented by corresponding lines of largely-repetitive code, which can further increase the fie size.

The complexity of a CAD model can be a significant factor in the 3-D print job. If the complexity is high, the CAD file is typically very large and it can be difficult or slow to export for 3-D printing. Higher resolution files can take a longer time to compile and longer to print. In addition, a single error in the file may require a redesign of the CAD model, in some cases from the ground up. Accordingly, at some point, the CAD files used to model the features of the 3-D part can become prohibitively large, and another manufacturing approach must be considered.

The burdens on the applications and the 3-D printer to process these files have become apparent. Processing power may be overtaxed as a result of these high-resolution files, thereby increasing the likelihood of errors that delay the process. Errors can range from minor errors to irreparable file corruptions as the CAD design model is developed and the resulting files are sent through the different process flows, often using disparate software applications or different file formats.

Given the finite amount of time that can practically be invested in developing these CAD design models, and the significant temporal and financial penalties that can be incurred as a result of errors resulting from CAD models, a fundamentally different design approach is desirable.

Accordingly, this disclosure presents various aspects of a parametric-based approach to AM in which one or more complex geometric features, as described below, can be identified in a computer-aided design (CAD) model using one or more corresponding volumetric regions, or simply "volumes". A method of modeling a part for 3-D printing includes determining a first volume of the part, modeling the first volume using a 3-D computer-aided design (CAD) model, determining a second volume of the part, and modeling a complex geometric feature (CGF) within the second volume using parametric modeling based on 3-D printing parameters. The first volume may modeled in a separate CAD file, without including a complex representation of the CGF. This technique allows the CAD file to be substantially smaller, which allows for faster compiling of the CAD file and faster overall printing times for the part. The second volume can in various embodiments be dynamically modeled and/or implemented using parametric techniques as described herein.

AM or 3-D printing as referenced in this disclosure can widely apply to powder bed fusion (PBF) printers including laser-based and electron beam based printers, and including Selective Laser Sintering (SLS), Selective Laser Melting (SLM), Direct Metal Laser Sintering (DMSL), Selective Laser Melting (SLM), Electron Beam Melting (EBM), Laminated Object Manufacturing (LOM), and Digital Beam Melting (EBM), etc. The AM techniques herein may also apply to stereolitography (SLA)-based printers, Masked Stereolithography (MSLA), Direct Light Processing (DLP), Material Jetting (MJ), Drop On Demand (DOD), Binder Jetting, Direct Energy Deposition (DED) printers, fused deposition modeling (FDM) and any type of three-dimensional printer that uses one or more energy beam sources or print heads to selectively fuse or deposit print material.

For purposes of this disclosure, a CGF represents any structure of a 3-D part for which parametric modeling is used to implement the structure within a determined volume of the part. Thus, a CAD model that includes various elements based on CAD modeling may separately include the determined volume. However, instead of modeling the geometrical details of the structure in the specified volume using CAD, parametric modeling is used to implement (i.e., 3-D print) the corresponding structure in the specified volume. The CGF is thus the structure that is rendered using the parametric modeling. Multiple CGFs may exist in a single 3-D part, which may be manifested as multiple corresponding volumes in the CAD model of the 3-D part, with each volume including a structure that is rendered using parametric modeling. In an embodiment, the file(s) that includes the CAD models of the part are separate from the files that include the parametric modeling.

In other embodiments, the model of the 3-D part may be partitioned into different determined volumes, including for example a first volume in which CAD modeling is used, and a second volume in which parametric modeling is used. More than one volume of each type may be used in a single 3-D part.

In various embodiments, CGFs may include a plurality of elements arranged in a grid, lattice, array, or network. CGFs may include lattices or other geometrical features with periodic, semi-periodic or random patterns. In some embodiments, CGFs may include large numbers of geometrical structures relative to the 3-D part in which they are included.

CGFs may also include a plurality of individual elements that are arranged together to constitute a larger pattern. CGFs may include other distinct types of structures in addition to these individual elements. Examples of CGFs may include load-bearing and supporting structures used in vehicles, aircraft, spacecraft, machine tools, or other heavy machinery. Additional examples may include crash structures in vehicles.

CGFs may incorporate complex lattice structures and other arrays of elements designed to accommodate heavy external loads without unduly increasing the mass of the 3-D part. CGFs may also include heat exchangers, which may include redundant arrays of small tubes, fins, connecting walls, and the like. The 3-D printed heat exchanger can be made increasingly complex, with a larger number tubes and related structural elements packed into a single geometrical volume for increased overall capacity. Heat exchangers may include other components using complex rib and fin designs, textured patterns, and other structures, each of which may be parametrically designed and printed using a series of exposure patterns.

Load bearing structures, crash structures and heat exchangers represent only a few examples of many possible structures that may be treated in part or in whole as CGFs in 3-D printing processes. CGFs may also include complex portions or sections of these structures, and need not include the entire structure.

Thus, since complex models can conventionally include memory-consuming structural redundancies, it is beneficial to render CGFs using parametric modeling. The CAD file can be made smaller, meaning that the CAD file can be compiled much faster using fewer memory resources. Also, since parametric modeling can often be performed faster and more efficiently than standard CAD models, the overall print speed of the part can be increased and the print time decreased. For example, a 3-D part may include various basic structural elements which are modeled in 3-D using CAD. The same 3-D part may include certain volumes that are determined more suitable for parametric modeling since they embody intricate or highly redundant structures. The basic CAD components of the 3-D part can be printed based on the compiled CAD model, while the specified volumes in the CAD model can be rendered using parametric modeling. That way, the highly complex or redundant structures (namely, the CGFs) can be printed using parametric techniques for the specified volumes, and the overall part can be printed in a much more efficient manner.

It is therefore beneficial to include, within determined volumes in the CAD model, CGFs that include structures within the part that are highly complex, or that incorporate large numbers of parts, or that otherwise would consume substantial memory resources if modeled using conventional CAD techniques.

Various aspects of a parametric design flow for three-dimensional (3-D) printing parts with complex geometric features may be incorporated into an existing AM design flow. This means that the existing process flow need not be redesigned to achieve the benefits of 3-D printing using parametric modeling. A computer-aided-design (CAD) file or CAD application suite may still be used in conjunction with one or more workstations, servers, PCs, etc., to generate a 3-D CAD model of a part, and to determine a volume in the part for including structures represented in the CAD model. After which, one or more volumes representing possible outer boundaries may be determined in the same 3-D part for including complex geometric feature (CGF) that can be rendered using parametric modeling, without disrupting the existing design flow widely utilized for CAD-based 3-D printing.

After a computer-aided-manufacturing (CAM) step which may involve the construction of support materials for the part (which may in various embodiments include parametrically-modeled CGFs used as support structures), the CAD model may then be sliced to produce a number of sequential layers that, when subsequently deposited as successive layers of print material on a powder bed of a 3-D printer, result in reproducing the structures modeled in the determined volume(s) in CAD.

Parametric techniques may be concurrently used to model and 3-D print CGFs in the other volumes in a 3-D part for which parametric modeling is specified. Parametric modeling is an approach to 3D CAD in which the part is modeled using features and constraints (levers or 3-D print parameters) instead of a pre-existing 3-D model. This allows users to automate repetitive changes in redundant parts and to model a complex part using only a few select parameters. In general, a parametric design involves a process of building a 3-D geometry by constructing a plurality of successive 2-D representations of the structure, using specific rules at each 2-D representation. In the case of a 3-D printer, the 2-D representation is manifested by a single cross-sectional layer of print material that falls within the boundary of the identified volume. The specific rules at each cross-sectional layer are implemented by using different energy beam-switching operations and/or different energy beam intensities, ON-OFF times during a period, etc.

In various embodiments, these parametric rules may be dynamically provided "on the fly" depending on factors such as changes to print orientation of the 3-D part, strategic determinations based on the initial printing, problems identified in the initial print, etc. The ability to dynamically modify the parametric modeling in response to anomalies or other events identified during the initial stages of the CAD-based printing stems from the fact that the parametric model is not part of the CAD model and is consequently not constrained by the CAD model.

In various embodiments, the instructions for manipulating the energy beam can be provided in a file to the 3-D printer's controller. In addition, parameters in some embodiments can be modified manually by interfacing with the 3-D printer. Also, in various embodiments, the beam switching and other techniques to parametrically print the CGF may be much faster and more efficient than using CAD modeling techniques.

The volume identified for the CGF can be used to define a boundary of a corresponding CGF without providing memory-intensive details of the CGFs in the CAD file(s). The CAD model can, for example, simply represent the determined volume as a solid body of material, which preserves the area for parametric modeling while keeping the CAD file size to a minimum.

Each of the CGFs can be printed, concurrently in sequence with the printing of the overall 3-D part, by using parametric techniques to manipulate the energy beam source or the print head during the fusing or printing step whenever the energy beam source is within the boundary of the volume. For example, a powder bed fusion (PBF) printer may, in ordinary operation, selectively fuse regions of a layer of print material based on compiled instructions for the 3-D part. When the energy beam source while scanning a layer reaches a boundary where the 3-D part transitions to the determined volume, the printer may discontinue use of the compiled instructions and may instead use a few identified parameters to execute parametric print operations independent of the 3-D CAD model to manipulate the energy beam source to selectively fuse the cross-section of the identified volume.

In various embodiments, the instructions can be dynamically assigned to expose two-dimensional patterns on the layer within the boundary of the volume. In an exemplary embodiment, the energy beam source may be selectively switched on and off with a certain frequency and a specific "ON" time to fuse regions of print material corresponding to walls, cylinders, tubes, inclines, or other structures. In various embodiments, the frequency and activation time of the energy beam may be high enough for a sophisticated printer to 3-D print walls that are thinner than a minimum thickness achievable using instructions compiled from the CAD model. Accordingly, another benefit of the parametric approach is that the processing system, free from the constraints of the CAD model, may manipulate the energy beam source to produce geometries that may not be achievable using the compiled set of instructions from the CAD model. Other types of benefits of printing based on parametric modeling including minimizing spacing between structures, and maximizing print speed.

When the printer reaches the boundary that transitions from the volume back to the 3-D part, the 3-D printer resumes ordinary printing of the cross-sectional layer based on instructions compiled from the CAD model. This sequence of operations is repeated for each layer of print material that includes a cross-section within the identified volume until the CGF is formed, after which the printer resumes ordinary operation to render the remaining portions of the 3-D part.

To form structures such as vertical or angled walls, parametric instructions may be used to repeat on each consecutive layer a two dimensional fused region (such as a line that extends in desired directions) on a plurality of layers, such that the fused regions (connected together by the layers of successive print material) they form the wall or other structure. The instructions may specify that the pattern in each layer of the volume be repeated exactly, or that an offset should be incrementally added for each successive layer (e.g., to produce an angled structure) until the CGF is printed.

While in some aspects of the disclosure, the modelled instructions can be executed by the print controller to manipulate the energy beam source to produce the CGF on the fly, in other embodiments the parametric instructions can be provided to the printer in a separate file in advance of the print job. In some embodiments, the 3-D printer may include logic (e.g., hardware) or code for dynamically assigning instructions and modifying 3-D print parameters to 3-D print a parametric model of the CGF.

Unlike in conventional approaches, the instructions used to manipulate the energy beam source to create the CGF are independent of the instructions that are compiled to print the remainder of the 3-D part. That is to say, while the instructions used to manipulate the energy beam source to render the CGF over a plurality of cross-sections of the identified volume need not necessarily be different from each of the instructions compiled from the CAD model, the instructions that render the CGF are independent of the CAD model in the sense that they are not compiled from the CAD model. As a result, the CAD modeling of the part places no formal constraints on the 3-D printing of the CGFs, aside from the CGFs being present with the CAD-based structures in the same 3-D part.

The principles in the present disclosure are widely applicable to virtually any type or flavor of part or component that can in principle be 3-D printed and that can be used in a vehicle, or in an arbitrary type of mechanized or non-mechanized assembly. For purposes of illustration, one such set of structures that will be discussed are lattice structures used to provide support or to bear loads in vehicular or other mechanical components. A well-designed lattice generally can provide significant strength for handling loads in the direction in which the anticipated forces are to be applied, without using excessive or unnecessary material that adds unwanted mass.

It will be appreciated, however, that the principles of this disclosure may be applied with equal force to numerous other CGFs, such as networks of arrays used in semiconductor fabrication equipment, vehicle parts, aircraft parts, spacecraft parts, machine tools, and other parts with complex or periodic geometries. Such structures may also include complex fastening elements or connectors, tube arrays, manifolds, and virtually any complex design having components that harbor a sufficient degree of repetitiveness or complexity sufficient to benefit from the parametric exposure patterns that can be applied.

In addition, the principles of the present disclosure may apply to support structures that are used in many different types of 3-D printers. As the name suggests, support structures may be used to support or hold up portions of material during a 3-D print that otherwise may be susceptible to deformation due to gravity and other problems.

Parametric designs can be used for generating lattices for load-bearing applications. Parametric modeling can be used to improve weight and stiffness, effective load-bearing capacity, etc. Like any other structure, in designing the overall component to be printed, the manufacturer models the lattice using CAD. The manufacturer may have to pattern the lattice in a CAD model to include hundreds to thousands of elements.

FIG. 1A is a flow diagram illustrating an exemplary CAD process flow 111 involved in the AM process followed by a parametric-based modelling technique 107. The process flow 111 may include a CAD design procedure 101, a computer aided modeling (CAM) design procedure 103, and a slice operation 105, followed by a 3-D printing step 113 which may include an expose operation 107 which physically implements the parametric modeling as described herein. The software flow shown in FIG. TA demonstrates that the exposure-based step 107 can be arranged to overlap with the 3-D print of the part itself, thereby preserving or increasing print time.

The AM process typically begins at 101 with the generation of a design (CAD) model representing a three-dimensional (3-D) design of the part to be printed.

To achieve the initial CAD (101) phase, manufacturers may use a commercially-available CAD software application suite installed on one or more workstations. The part to be 3-D printed is modeled using the CAD software. Using the conventional approaches, the design of the 3-D part may take weeks or longer, with the greatest amount of that time typically dedicated to developing the lattices and other complex structures that make up some portion of the part.

The output of this conventional step may be an STL file that includes a geometric representation or model of the component. CAD models enable the entire component to be visually accessible on a computer screen.

According to an aspect of the disclosure, a CAD model of the 3-D part may be generated, and one or more volumes may be determined that correspond to one or more respective CGFs. The volumes may be used in the CAD model for "bookmarking" different types of parts. For example, in one embodiment, a first volume may be determined for including a CAD model of a part within the first volume, and a second volume may be determined for including a parametric model of a CGF with a second volume. Multiple volumes may be used in a single part and may be used to specify CAD modeling as well as parametric modeling.

Bookmarking for the parametric model may be performed in different ways. In one embodiment, the designer identifies the volume in the CAD model as one solid body of material to be 3-D printed. The printing procedures later used for parametrically rendering the CGF in the volume can be configured to override any contrary instructions to 3-D print a solid body in the volume.

In other embodiments, the CAD software may use different colors to specify the type of modelling or printing to be used in that volume. Different colors may be used for different parametric models, to parametrically model different types of structures, or to identify different 3-D parameters to be used during a parametric-based print. These colors are arbitrary and can be substituted for other colors.

In still other embodiments that may depend on the CAD software capabilities, "markers" other than colors may be used to pre-designate the volumes. For example, in an embodiment, the geometric border corresponding to the pre-designated volume may be numerically specified. Different markers, colors, symbols, etc., may be used to designate different regions within a volume on a CAD file where more complex parts will be associated with the region defined by the symbols. In various embodiments, each parametric volume may instead be associated with one marker.

Referring still to FIG. TA, the CAD modeling 101 is completed and a model of the 3-D part with the volumes determined for the CGFs present. Next, a computer-aided manufacturing (CAM) step 103 may be performed following the CAD modeling step 101. It is generally understood in conventional AM techniques that that in some situations, structures to be printed at an angle or an incline may be overhanging, and may require support structures during the print process to maintain the shape and integrity of the inclined or overhanging part. For example, in some 3-D printers, 3-D printed components must be oriented by 45 degrees or more from a horizontal reference, after which a support structure during the print job is necessary.

The CAM step 103 is used for computing or otherwise determining the need for support structures. Much like the CAD modeling in the CAD stage 101, the CAM stage 103 can be increasingly processor-intensive for parts with sophisticated orientations and structures. As the CAD model becomes more sophisticated, the modeling of support structures in the CAM stage 103 also can become more complex.

According to various embodiments, the need for a computationally intensive and potentially error-inducing CAM stage 103 can be reduced, if not removed, by characterizing the support structures as CGFs that can be modeled in the CAD model as solid bodies. In various embodiments, a support structure can be bookmarked as a solid body underneath a separate volume for an existing CGF. The need for a CAM stage 103 may be reduced significantly, or altogether eliminated by designating the support structures as CGFs and by 3-D printing them using parametric models.

Besides reducing complexity, a significant advantage of reducing or eliminating CAM modeling is that this also reduces or eliminates the need for the CAD software to interface with potentially different CAM software, still further reducing the possibility of errors caused by the interfacing of disparate applications.

Referring again to FIG. TA, in a slice stage 105, a software program may partition a CAD file into a number of slices or layers. The thickness and number of the slices may be dependent upon the type or model of the 3-D printer including physical limitations of the 3-D printer, or upon the CAD model. Each layer or slice may be encoded with the necessary patterns to produce the part identified in the 3-D CAD model after the corresponding layer of print material is sequentially deposited onto the 3-D printer. Thus the 3-D printer compiles the slices into a series of instructions to build the part on a layer-by-layer basis.

In contrast to CAD-based modeling which follows a rigid design flow, parametric modeling of the CGF in the specified volumes may generally occur at any stage of the process after the volumes are determined in the CAD model. This may include changing parametric parameters during the initial stages of the 3-D printing.

Following the slice operation 105 of the CAD process flow 111, the 3-D printing may commence using the printer instructions compiled beforehand. In a typical powder-bed fusion laser printer, a re-coating step may occur wherein a layer of print material is evenly deposited over a substrate. Following the re-coating step, a fusing or printing step may occur in which the print controller uses the compiled instructions to selectively fuse regions on the layer corresponding to a cross-section of the 3-D part to be printed. After this print step, another re-coating step may occur in which a next layer of print material is deposited, after which the printer may perform another fusing step on that layer, and so on until the 3-D part is formed. Various techniques for 3-D printing may be used in lieu of this example, and are equally applicable in the context of this disclosure.

Figure 1B:
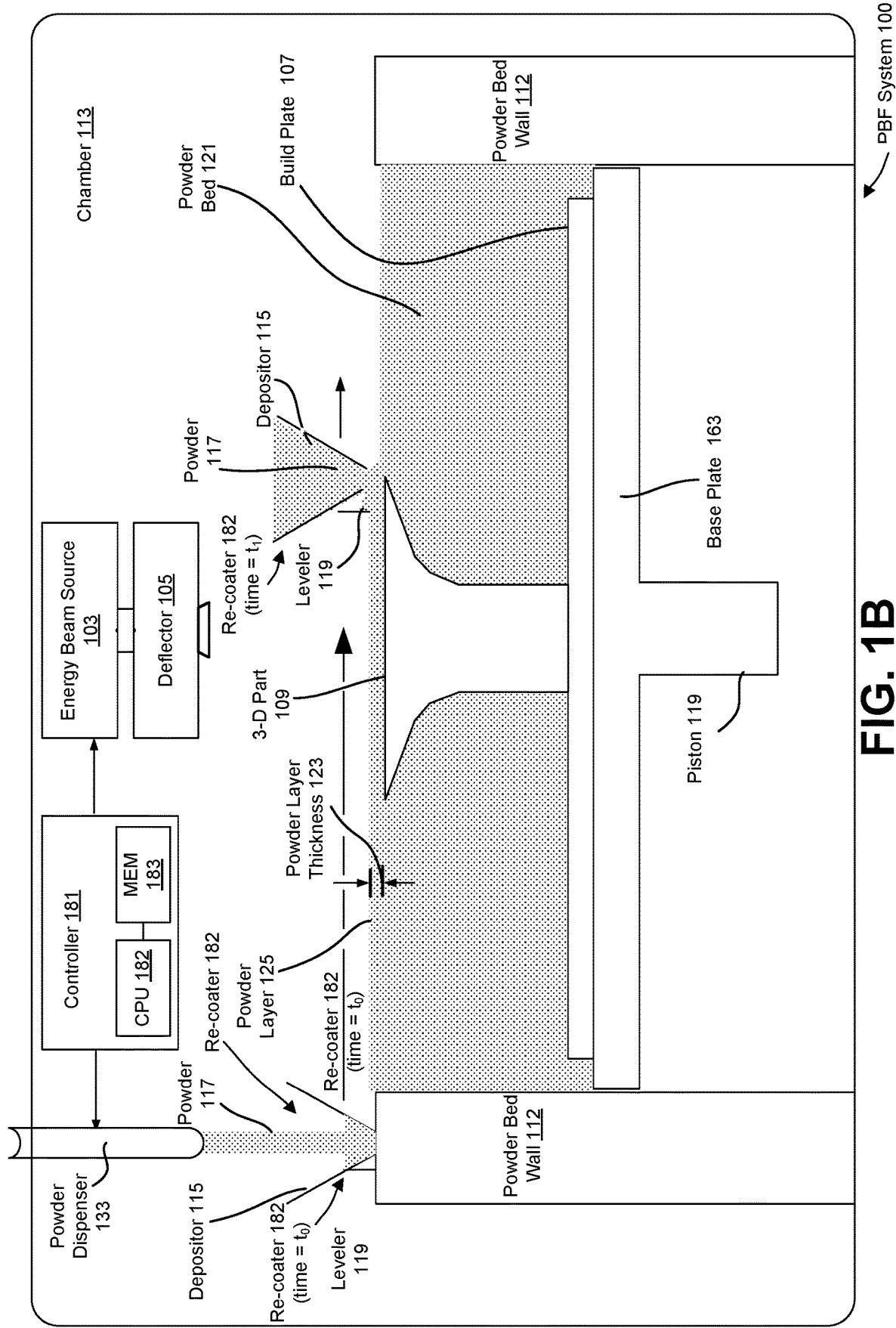
FIG. 1B is a block diagram of an exemplary 3-D printer while performing a re-coating step.

FIG. 1B is a block diagram of a powder bed fusion (PBF) 3-D printer system 100 while performing a re-coating step. The figure is not drawn to scale and is intended to demonstrate one of many possible exemplary 3-D printers to which the principles of this disclosure may be applied. A front cross-sectional view of the system 100 is shown. In an actual 3-D printer system 100 of this type, the powder bed walls 112 extend around an entire perimeter of powder bed 121 to encase the powder bed 121. A partially-rendered 3-D part 109 is shown within the powder bed 121, resting on a build plate 107 positioned at the base of the powder bed 121.

The system 100 includes a piston 119, a base plate 163, and the build plate 107 atop the base plate 163 for supporting the 3-D part. The system 100 further includes a powder dispenser 133 and a controller 181. The controller 181 may include one or more CPUs 192 and memories 183, such as RAM or cache memory, for storing code and data. The controller 181 may be implemented directly within the system 100. In other embodiments, the controller 181 may be part of a personal computer, workstation, or server coupled to the printer system 100 for controlling the printer 100.

The controller 181 performs the print-related functions and executes print instructions. While in some cases the controller 181 may by distributed as separate processing devices (e.g., processors, CPUs, digital signal processors, field programmable gate arrays, and the like) in different parts of the system 100, for purposes of simplicity the controller 181 will be referenced as a single block that incorporates all of these control functions.

The system 100 further includes a powder dispenser 133, that provides print material to the system 100 under the control of controller 181. The powder dispenser 133 may deposit powder 117 in a depositor 115, also known in some cases as a re-coater 182, a hopper, or a mini-hopper. The controller 181 may cause the powder 171 to be deposited into the re-coater 182, e.g. beginning at a time $t=t_0$. The powder dispenser 133 may fill the re-coater until it is full. The controller 181 may be configured to successively deposit layers of print material, e.g., having a specific thickness 123, over a period of re-coat or deposit cycles. The system 100 shown has been printing 3-D part 109 over a prior time period using the controller 181 to control the energy beam source 103 to emit an energy beam 161 (FIG. 1C) during a print cycle.

Figure 1C:
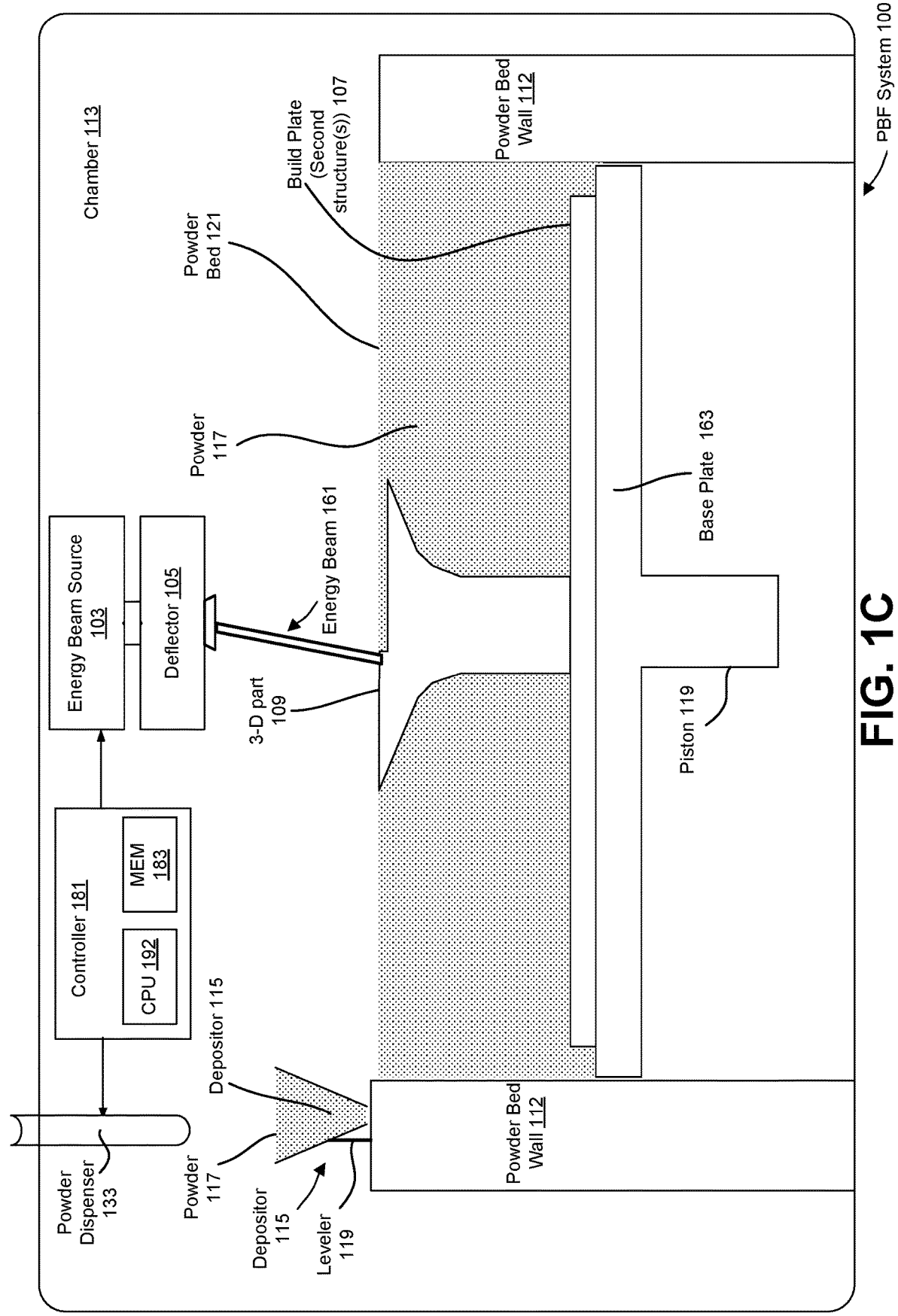
FIG. 1C is a block diagram of the 3-D printer of FIG. 1B performing a fusing step.

Referring still to FIG. 1B, an exemplary depositing step is shown where the re-coater is advanced across a powder bed 121 to deposit another layer of powder 117. In this exemplary system 100, the printing is performed by a series of re-coat cycles, where each re-coat cycle (FIG. 1B) is followed by a print cycle (FIG. 1C). At the beginning of the re-coat cycle (or the end of the prior print cycle), the re-coater 182 may return to the original location corresponding to time $t=t_0$ in the illustration. There, the re-coater may receive a refill of powder 117 from the powder dispenser 133 in order to perform another deposit step to deposit another layer.

To deposit a layer of powder 117 as shown, the re-coater 182 advances across the powder bed 121. As it moves, the re-coater uniformly deposits powder and uses a leveler 119, which may be a blade, a roller, or the like, to even out the layer so that it is uniformly deposited above the preceding layer. Only one re-coater 182 is actually present in this illustration. The re-coater 182 is shown at time=$t_1$ to illustrate that the re-coater 182 is advancing across the powder bed 121 over a period of time to deposit another layer. When the re-coater 182 reaches the far right end, the layer has been deposited and a subsequent print or fusing step may ensue (FIG. 1C). The re-coater 182 may either return to its original position before the print step begins, or it may stay on the far right and then return after the print step has occurred, for example.

The re-coater 182 is shown as full at time $t=t_1$ for embodiments in which the re-coater 182 has a larger capacity and can be used for a few print deposit steps. More commonly, however, the powder 117 in the re-coater 182 is quickly depleted, and the re-coater 182 is near empty when the print layer is deposited. The re-coater 182 thereafter receives additional powder 117 sufficient to deposit another layer when it returns to its original position.

The controller 181 is configured to coordinate a level of the build plate 107 with the progress of the print job by using piston 119 to slowly move the base plate vertically downward with each additional deposited layer, in order to account for the increasing size of the 3-D part and the increasing amount of powder 117 in the powder bed. This vertical movement also keeps the energy beam source 103 at an approximately constant vertical distance from the 3-D part 109 to control the beam intensity. The powder bed, energy beam source 103, and deflector 105 used to direct the energy beam 161 under control of the controller 181 may all be housed in a closed chamber 113 which, depending on the type of printer, may either be a vacuum, or it may be filled with an inert gas. In either case, the chamber 113 protects the 3-D part 109 from being contaminated by other elements (such as a metal 3-D part being oxidized, for example).

FIG. 1C shows the PBF 3-D printer system 100 during a print step after a fresh layer of powder 117 has been deposited by the re-coater 182/depositor 115. The controller 181 conventionally receives instructions compiled using the sliced CAD model, and optionally includes any necessary support structures determined to be necessary at the CAM stage 103 (FIG. 1A). The controller 181 controls the energy beam source 103 (e.g., by directing the energy beam 161 with deflector 105) to selectively fuse regions of powder that correspond to solid parts of the cross-section of the 3-D part. The energy beam source 103 is not used to fuse powder 117 in the layer that does not correspond to a part of the 3-D part 109.

The energy beam source 103 may include an electron beam, a laser, an electric arc, or other sources of energy used to heat and fuse the powder 117 selectively into a solid structure. In some 3-D printers, the energy beam source 103 may instead constitute a print head used to deposit material to subsequently be solidified (such as in fused deposition modeling based printers, etc.). Referring back to the PBF printer system 100 shown, the system 100 may include a plurality of energy beam sources 103 for concurrently printing one or more 3-D parts within the chamber 113 based on the compiled instructions from the CAD model (e.g., which instructions may be forwarded to memory 183 for processing by the CPU 192.)

As noted above, the controller is directing the energy beam source 103 to use the energy beam 161 to fuse or solidify a portion of the 3-D part 109. In practice, the heat from the laser or electron beam may create a weld pool of liquefied powder prior to the solidification of the powder 117.

In another embodiment as described herein, the controller 181 may be configured to dynamically adjust levers or parameters of the energy beam source for identified layers based on one or more parametric instructions received by the controller 181. Thus, the controller 181 may instruct the energy beam source 103 to switch the energy beam 161 on and off using a specified frequency or intensity, as described further in this disclosure. The controller may also change the position of the deflector 105 to manipulate the corresponding position of the energy beam 161.

In various embodiments, the manufacture may maintain a database with a separate set of parametric instructions for manipulating the energy beam source of a 3-D printer within the volumes of the part determined for parametric modeling. The instructions in this set can be used during the expose procedure 107 to directly manipulate the energy beam source (e.g., by steering the beam, switching beam frequencies, altering beam intensity, etc.) to produce essentially whatever CGF is desired. In some embodiments, a single instruction to fuse material using specifically-identified ON-OFF switching of the beam over different 2-D regions within the cross-section of the volume may be used on all layers within the volume to form the CGF. In this example, selectively positioning the beam to be ON-OFF at each layer (e.g., to correspond to a desired wall) may be sufficient to create part or all of the CGF. In all of these cases, using the separate instruction set to manipulate the energy beam source directly, the 3-D printing process can be performed much faster than using compiled instructions from a 3-D CAD model.

In some embodiments, a layer may be printed using the CAD design first, either as a default or in volumes in which CAD modeling is associated. Then, only and after the regions of the layer associated with the CAD model are complete, the regions associated the CGFs for the same layer may be printed using parametric modeling.

In some embodiments, prior to the beginning of the print job, the designer can access a suitable instruction set from a database that will be used in 3-D printing the CGFs in applicable regions. This way, when the printer reaches a boundary that includes a solid-body in the file known to represent a CGF, the 3-D printer already has the necessary parametric instructions from an instruction set which it uses to render the CGF. The parametric instructions may also be applied to the 3-D printer directly from a designer using one of the printer inputs, or through an intermediary program supplied to the controller, that dictates the parametric pattern the laser or other energy beam needs to take for each slice to ultimately produce the desired CGF in the correct regions. In other embodiments, the parametric print parameters may be dynamically modified during operation of the 3-D printer, for example, to account for unknown factors discovered during the initial 3-D printing of the part.

3-D parameters used in parametric print instructions may include varying the energy beam intensity, frequency, position, direction, ON-period, OFF-period, etc. Sometimes the capabilities are circumscribed by limitations inherent in the 3-D printer. In general, however, the modern commercially available 3-D printers are becoming more versatile and flexible, and are therefore more likely to have a broad array of capabilities, including varying the energy beam parameters "on the fly" and other sophisticated abilities for midstream switching of commands.

Parametric modeling may be used to build exceptionally small arrays of components all arranged very closely together relative to the spacing possible in CAD modeling, since in the former case, the switching of the energy beam can be precisely controlled. Conventional instructions adopted by different commercially CAD packages, however, often impose their own limitations in print spacing and sizing for a given CAD model, to accommodate a wider range of printers having different minimum achievable print precisions.

Because the expose step 107 can occur in parallel with the 3-D printing step 113 (FIG. TA), the parametric modeling and printing can occur concurrent with the 3-D printing, which in turn can further reduce the overall 3-D print time. In other embodiments, the parametric modeling can occur prior to the 3-D printing step, such that the parametric model is complete before beginning the print job.

The use of parametric instructions to produce the CGF, such as a lattice, can begin by a determination of the CGF in the volume to be modeled. In an embodiment, the design may focus on what 2-D representations are required to construct the CGF (e.g., the lattice) in three dimensions. For example, it may be determined that the intensity of the energy beam source should be varied at different regions of a layer, e.g., to fuse parts having a different thickness. An "on" time of the beam may be determined to correspond with a 2-D length or width of the lattice at a particular layer. Walls that are very thin may require an beam "on" time that is very small relative to the off time, for each pass of the energy beam. For selective spacing, the frequency of the beam may be varied. Thus if a large number of closely-spaced vertical structures are desired, the beam frequency for that area may be chosen to be very high. Also, in some embodiments, it may be desirable to orient the walls of a lattice structure at a particular angle. To print angular structures, the energy beam may fuse a region on a first layer, then fuse the same region on a second layer above the first layer with a predetermined offset, and so on. This pattern can result in structures that are oriented at a desired angle as they extend from a bottom of the volume to a top. In other embodiments, the energy beam 103 may be rotated or manipulated in other patterns, e.g., to form collections of tubes, such as for use in a heat exchanger.

In some examples, the input to the printer during the expose step 107 may be a series of instructions from the instruction set that correspond to different colors or numbers associated with the volumes to selectively manipulate the printer's energy beam to achieve the desired CGF within the volume. For example, when a certain color or numerical value assigned to a portion of a slice within the parametric volume is identified, the color or number can be indexed to the instruction set. The index may identify an instruction to manipulate the energy beam source to fuse material within the cross-section of the identified color. In other instances, the color or number may index an instruction within the instruction set that causes the energy beam to switch on and off at a predetermined frequency to provide a spacing of material (as described above) with that color or number. In like fashion, other colors or numbers in other regions of the volume may be indexed to different instructions that take into account the intensity of the energy beam, the angle, frequency and positioning of the beam, etc., for rendering the cross-sectional portion of the slices in the desired manner.

Using parametric techniques can help avoid performing certain procedures that must be sequentially performed. For example, 3-D CAD modeling typically requires one or more of patterning, Boolean operations, and trimming operations. These operations ordinarily cannot be performed in parallel and instead are conducted sequentially. These operations can in some cases be avoided where a parametric approach is used.

Further, when traditional 3-D compiled instructions are executed, the exposure pattern may include orders, contours, hatches, etc., that when applied to a lattice geometry can cause a large energy flux that may compromise the build. Additionally, these exposure patterns can often make it difficult for powder egress due to lattice density and local sintering, the latter events leading to unwanted consolidation of powder. The use of parametric modeling gives the designer more flexibility to avoid these problems by varying the beam intensity or by printing the lattice in a manner or orientation that avoids powder consolidation in the wrong places.

As discussed above, it is often necessary to make minor changes at the end of the design process. Any type of iterative process is challenging and time consuming. As an example, for lattice structures, an important characteristic apart from cell shape, type, and density is build direction and orientation of the final 3-D part. Knowledge about optimal orientation of the component in practice is often not available until after the design of the structure is generated and initiated in the computer-aided manufacturing (CAM) process, or even immediately prior to the anticipated print. Thus, if a change is made to the build direction after the part is modeled, the lattice structures that were initially 3-D modeled to be self-supporting (i.e., requiring no supplemental support material) may no longer be self-supporting. Requiring a change in orientation may at the very least require that the manufacturer return to the initial CAM stage to add support structures for any newly overhanging regions. In lieu of returning to the process flow, the support structures may in various embodiments be implemented parametrically.

Figure 2:
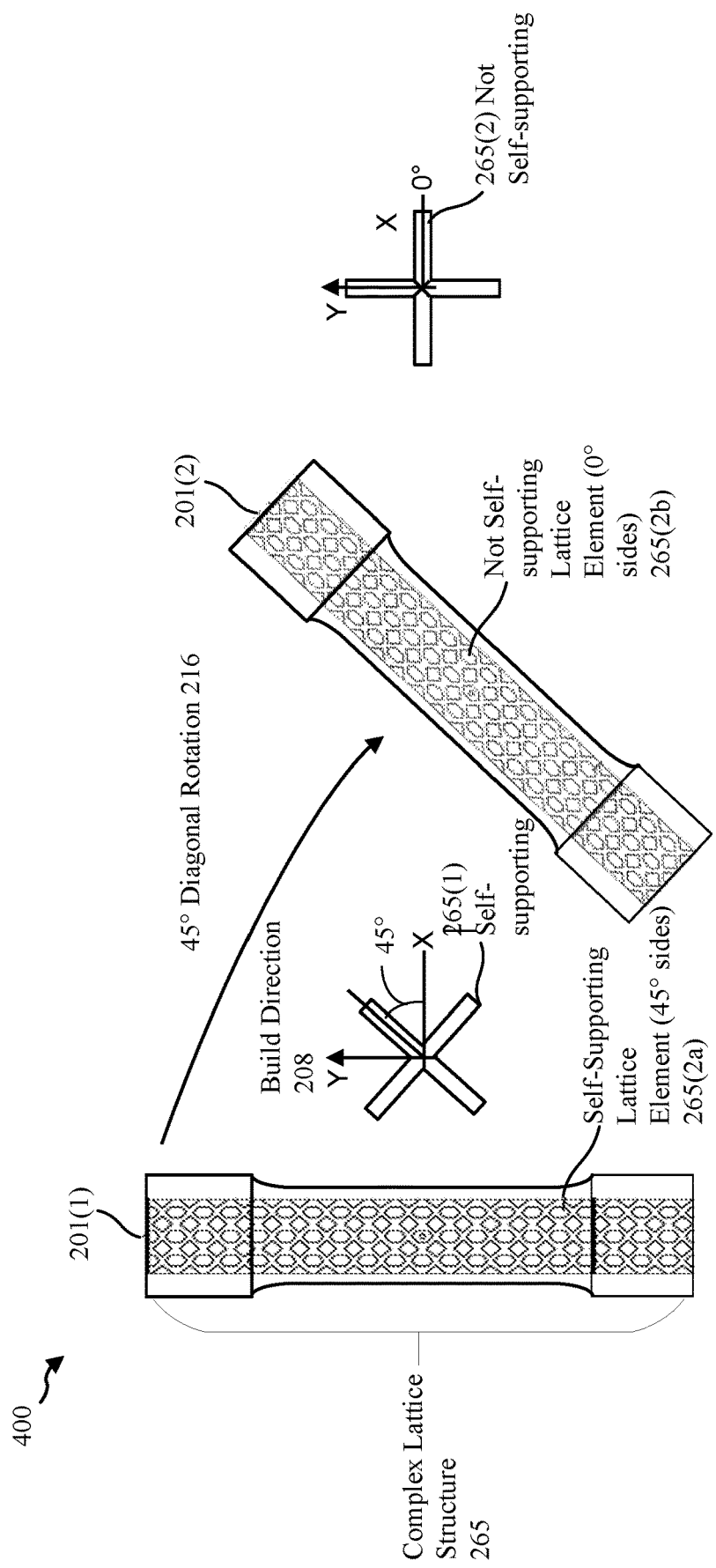
FIG. 2 is a conceptual diagram illustrating different orientations of lattice structures when a 3-D part is re-oriented.

FIG. 2 is a conceptual diagram 400 illustrating different orientations of lattice structures when a 3-D part is re-oriented. A model of apart 201(1) designed to include a complex lattice structure 265 is shown. The lattice structure 265 of the part 201(1) may include a large number of individual lattice elements 265(2a). A large scale version 265(1) of one of the lattice elements 265(2a) is shown to the right of part 201(1). Consistent with the operation of certain 3-D printers including several models of PBF printers, it is assumed for the purpose of this example that the 3-D printer herein can accommodate self-supporting structures (i.e., structures that do not require support material) provided the structures are at a minimum of, say 45°, relative to the X axis in the printer's coordinate system. The 3-D printer used for the structures in FIG. 2 also has a build direction 208 that is parallel with the Y axis of its coordinate system. Tube 201(1) and the structure 265 of lattice segments 265(2a) are initially modeled at an angle of 45° relative to a surface of the print substrate, as more clearly shown in the enlarged version 205(1) of lattice element 265(2a). The initial build orientation is therefore positioned such that the component is self-supporting.

Subsequently, and immediately prior to the print, certain factors may militate that the build direction should be changed. For example, it may determined that the 3-D part (which may include cylinder 201(1) along with other components) should be rotated by an angle of 45 degrees clockwise relative to a vertical axis X. In this case, the cylinder 201(1) would be rotated by that angle, as would the lattice elements 265(2a) to result in a rotated version 201(2) of the same cylinder and a rotated version of the same elements 265(2b)). As is apparent from FIG. 2, each individual lattice member 265(2) would now have members that are now 0 degrees relative to the x axis, and as such, they are no longer self-supporting, since these overhanging members would now be subject to stronger downward vertical forces due to gravity and can sag or deform during the print if not adequately supported.

Accordingly, to remedy the new problem created by the last-minute need for changing the build direction, the manufacturer is relegated to returning to the initial CAD file stage to redesign the lattice components wholesale. In addition to the expenditure of time, the file is again subjected to all the risks of errors or corruption already once occurred at the initial stage.

In light of the above constraints, the more complex features of the part, including the array of lattice elements 265, can be modeled as a solid body using a parametric design. Moreover, if support is still needed for the part, then support structures can be included and modeled as CGFs as well. The support structures can then be configured to occupy volumes where the support is needed.

Figure 8:
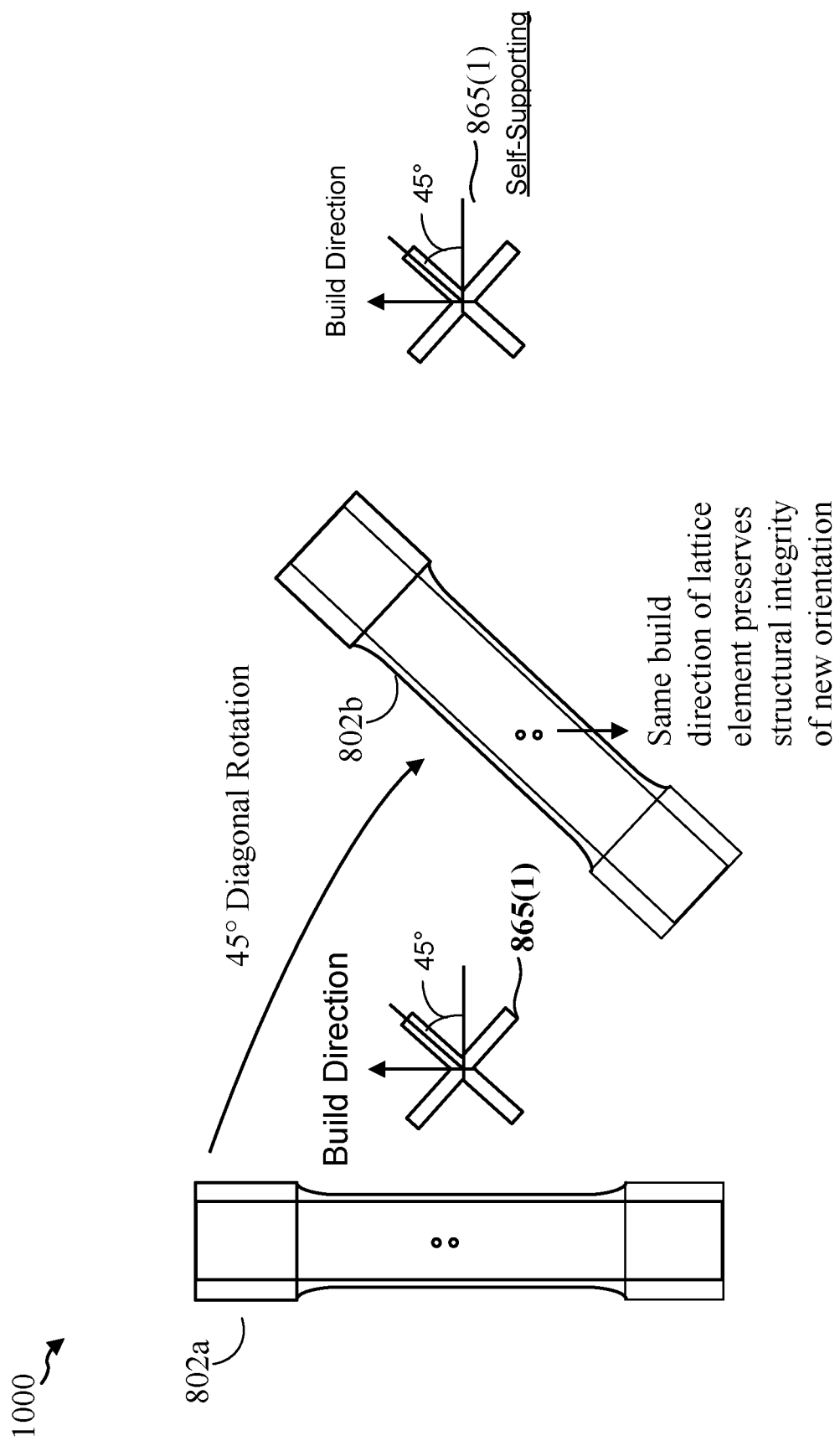
FIG. 8 is a conceptual diagram of a component undergoing a change to a new orientation and an orientation of lattice elements within the component.

The problems identified in FIG. 2 with respect to the orientation of the structure can also be resolved by the present approach (see, e.g., FIG. 8). As noted, in conventional cases the entire part is rendered using CAD software including the lattice portions. Thus, any decision to rotate the generic part (201(1) to 201(2)) can be particularly detrimental to the CGF, since the CGF may now include overhangs subject to unwanted sag, and conventionally the CAM stage 103 must be revisited to model support structures, which in turn may require recompilation of the print instructions and re-slicing of the model.

However, in various embodiments using the principles described herein, the lattice array can be modeled as a CGF. Thus the manufacturer has complete control over the exposure pattern right up to the point of the actual expose process. For example, if a rotation of the entire print structure is deemed desirable, the manufacturer can reorient the build direction of the CGF by changing the angle of the laser beam in an amount that compensates for the rotation of the 3-D part. Thus, the orientation of the CGF can be preserved by a simple manipulation of the energy beam, without the manufacturer needing to return to the CAD or CAM stages to add support structures or potentially worse, to redesign the lattice in the event the load requirements change.

As an illustration, prior to the expose stage 107, the energy beam may be given specific instructions as to spacing and other parameters to use when passing over layers of the second volume. That is to say, the laser or energy beam is provided instructions, or a program, that defines how the energy beam should be run across the slices that include the second volume. It is in the subsequent expose stage that the laser or energy beam will be operated in a manner that inserts the lattice or other complex pattern in the second region. Using the provided parametric instructions, the energy beam may dynamically adjust its switching frequency and beam intensity as necessary to produce the necessary 2-D parametric representations of the structures for each layer of the second volume. Thus, in the event a rotation of the part is required as in FIG. 2, the CGF can be properly reoriented or redesigned by modifying the print parameters of the energy beam. In some embodiments, such as described with respect to FIG. 8, even if a rotation occurs to the 3-D part, the CGF may not require any changes since it was designed in a manner that is positioned to not require support structures, regardless of changes to the 3-D part.

In some embodiments, the simpler 3-D features of the part can be modeled in a first volume as a 3-D CAD model, and then the more complex features can be modeled in a second volume as a parametric model. Complex features may include any such features in which it would be undesirable to have to re-design in the event of a major error during the process flow, or a requirement to re-orient the structure.

Figure 3:
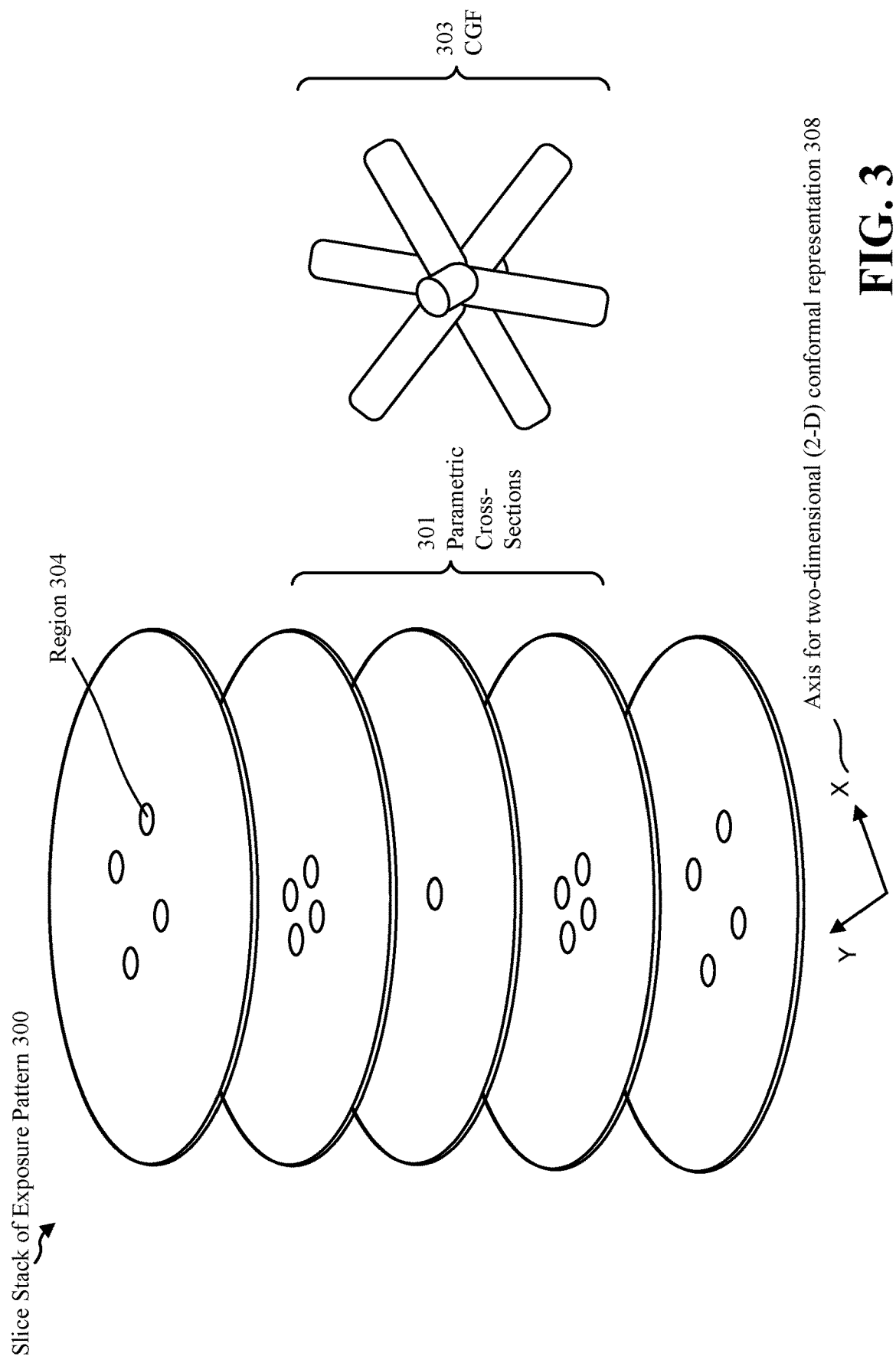
FIG. 3 is an exemplary illustration of a lattice element and a sliced stack of an exposure pattern of the lattice element formed by directing an energy beam source of a 3-D printer to fuse regions in successive layers of a volume.

FIG. 3 is a perspective view of an illustrative stack 300 of consecutive slices 301 used in the context of the present disclosure to generate a lattice element 303. As illustrated by the parametric cross-sectional slices 301, the energy beam can be configured during the expose stage to be selectively turned on and off to create different patterns that lead to more complex structures. In one configuration, exposure patterns can be defined as regions or spots 304 within a slice 301 or a layer that is selectively fused as described in FIG. 1B. As 2-D representations of the cross-sections 301 are progressively rendered from lower to higher layers, the varying geometric patterns are correspondingly formed. In the plurality of cross-sections 301, for example, the four more distant regions 304 at the lowest and highest respective layers correspond to regions of fused print material that represent the outer portions of element 303. As the outer portions come toward the center and meet in the center at the middle layer, the fused regions in the cross-sectional layers progressively move closer in the slices 301, and in the middle slice, the regions are close enough to converge. This converged region 304 corresponds to a single fused region at the center of the lattice structure 303 (to the right). As the lattice regions 304 begins to spread out again from the single region of fused material, the number of regions (here, four) can increase along with increased spacing, as shown in the upper portion of cross-sections 301.

Thus, a simple parametric instruction may construct this more complex lattice element 303 by specifying the number of regions 304, and by adding or subtracting an offset representing a distance the regions are from each other, depending on whether the lower or upper portions of the lattice are being rendered. In the center slice, the offset specifies that all four regions have zero distance between them. The result of this operation is a 3-D physical lattice element without having taken the time to model the element beforehand in three dimensions. Thus unlike use of the CAD model compiled into instructions and then fed to the 3-D printer for rendering the part, the spacing of the fused regions 304 can typically be conducted in a much faster manner, and can also be repeated for creating an arbitrary number of similar elements in a given volume. Thus the CGFs in the part can be made more quickly and efficiently than using slower CAD models that needlessly repeat the same or similar structures in the context of the 3-D model.

Control of the energy beam can be enabled using different coordinate systems, some of which may be dependent on the 3-D printer. As a simple example, the 3-D printer that produced the structure 303 in FIG. 3 can be controlled by using an x-y 2-D coordinate system (as shown). The z dimension can be omitted.

In reality, the layers or cross-sections 301 are in physical contact with one another (unlike as shown in the collection of slices 303 in FIG. 3) as the layers are physically deposited one after another, so that the fused regions 304 can be fused together to create actual lattice element 303 as soon as the next layer is scanned. Also, while parametric modeling in theory uses 2-D instructions to generate 3-D models, the layers 301 of material are not actually two-dimensional in nature, but only represent an approximation of 2-D sufficient for parametric modeling purposes. It should also be noted that the cross-sectional slices 301 are not shown to scale, but rather shown larger to illustrate how a complex lattice element can easily made.

It should be noted that segment 303 is a relatively simple example of a lattice structure. In fact, using simple variations of exposure patterns and/or different parametric schema, the software can configure the energy beam to render elements that are of any arbitrary shape, include convex or concave shapes, hollow or dense shapes, and other shapes that can be easily implemented. In an embodiment, custom algorithms can be written to execute these arrays of elements. These elements are also not limited to lattice structures, but can extend to any type of CGF.

The principles described in FIG. 3 can be logically extended to structures having an arbitrary complexity, while using a small number of 3-D print parameters. Also, depending on factors like the achievable precision of the 3-D printer, and its maximum print speed, hundreds of such regions 304 can be fused in a given border area to produce a very dense lattice, as desired. In addition, the location of the spots can change in order to change the angle of the individual branches coming off the center of the lattice element 303 as desired, or to make the structure bigger or smaller. In some cases, a select few large elements 303 may be sufficient to bear an anticipated load, while advantageously minimizing the mass that will be maintained in the structure.

The memory requirements for the lattice in FIG. 3 may be far less intensive than in the traditional approach, because unlike the traditional approach, the lattice elements of FIG. 3 need not be modeled in CAD, and in some cases the same instructions may be repeated layer after layer because the same or similar structures are being rendered. In other embodiments, the structures may be geometrically different, but the pattern to 3-D print the structures may be similar and may only require modifying two or three parameters. As noted above, the bottom-most layer in FIG. 3 may be patterned to include the four spots that will ultimately represent a lower portion of the lattice element 303. The energy beam shifts at the next layer upward in 301 as the spots are brought closer together. At the next layer up (third from the bottom), all the spots are in the same spot, and then in the following two steps, the spots shift out again. This process shows that a non-trivial structure when modeled in CAD, particularly when modeled as tens, hundreds, or thousands of elements, can be rendered by the printer easily by manipulating the energy beam to turn on and off at specific locations in a repeatable manner. Multiple arrays can be concurrently created on each layer.

As another example, if a denser lattice is desired with more lattice elements, the designer can decrease the spacing by turning the laser on and off with a higher frequency. For a sparser lattice, by contrast, the spots can be spaced farther apart by increasing the spacing. In addition to changing the density of the lattice elements 303, the size of the lattice elements 303 can just as easily be changed. For a larger lattice element 303, the energy beam can be kept on for longer to fuse bigger regions. For smaller lattice elements 303, the opposite procedure can be invoked.

As FIG. 3 demonstrates, CGFs can be easily rendered by adjusting the corresponding 2-D pattern using one or a few parameters. In an embodiment, the exposure pattern can be modified in or near real time to change the nature of the geometric structure quickly, e.g., when an anomaly in the CAD model is detected. If it is determined that subsequent components require adjustments, subsequent prints can be conducted at the expose stage by varying the exposure pattern without having to return to the beginning CAD stages.

In some embodiments, walls may be fused in the sliced stacks in lieu of the small spot-like regions 304. The walls can serve multiple functions of, for example, bearing loads and creating manifolds of tubes through which fluids can pass. The CGF structures can include numerous geometrical features.

In another embodiment, during the CAD stage, the designer may model a primary structure (which is part of the overall component) as a solid volume. The primary structure be the outer part of the cylinder, and have an outer boundary given a first color. A second volume may be included as cavity within the cylinder, for example, and the cylindrical boundary and inner cavity may be differentiated by assigning different colors to the cylindrical boundary and the cavity. The inner cavity may then be defined to occupy an appreciable percentage, if not substantially the entire amount, of the volume within the primary structure.

After the CAD file of the component is passed through the subsequent computer aided manufacturing (CAM) and slice programs to produce a refined model and print instructions that can be directly fed to a 3-D printer, the exposure period concurrent with the print process occurs as usual. However, in one embodiment, an exposure pattern is used to render complex structures within the inner cavity of the cylinder whose design can, if desired, be performed at the latter part of the manufacturing process using the knowledge already gained about the 3-D part in the prior CAD, CAM and slice stages. The lattice structure used to occupy the inner cavity can also be designed concurrently with or prior to the design of the CAD image, and can be modified later if necessary.

CGFs, lattices and other matrices and arrays of complicated physical structures can be 3-D printed by applying any desired exposure pattern to the solid bodies, ordinarily using a simplified instruction set for directly switching or manipulating the energy beam source. Further, the ability to render parametrically-modeled structures optionally in or near real time means that, before committing to the final details of the CGF design, the manufacturer has the benefit of a completed 3-D CAD model showing the other portions of the component/3-D part in CAD. The manufacturer is therefore in a position to make more informed and calculated decisions about how to best model the complex structures, e.g., taking into account the remaining geometric structure of the completed part. In some cases the designer can even observe the beginning stages of the print before committing to the CGF.

Figure 4:
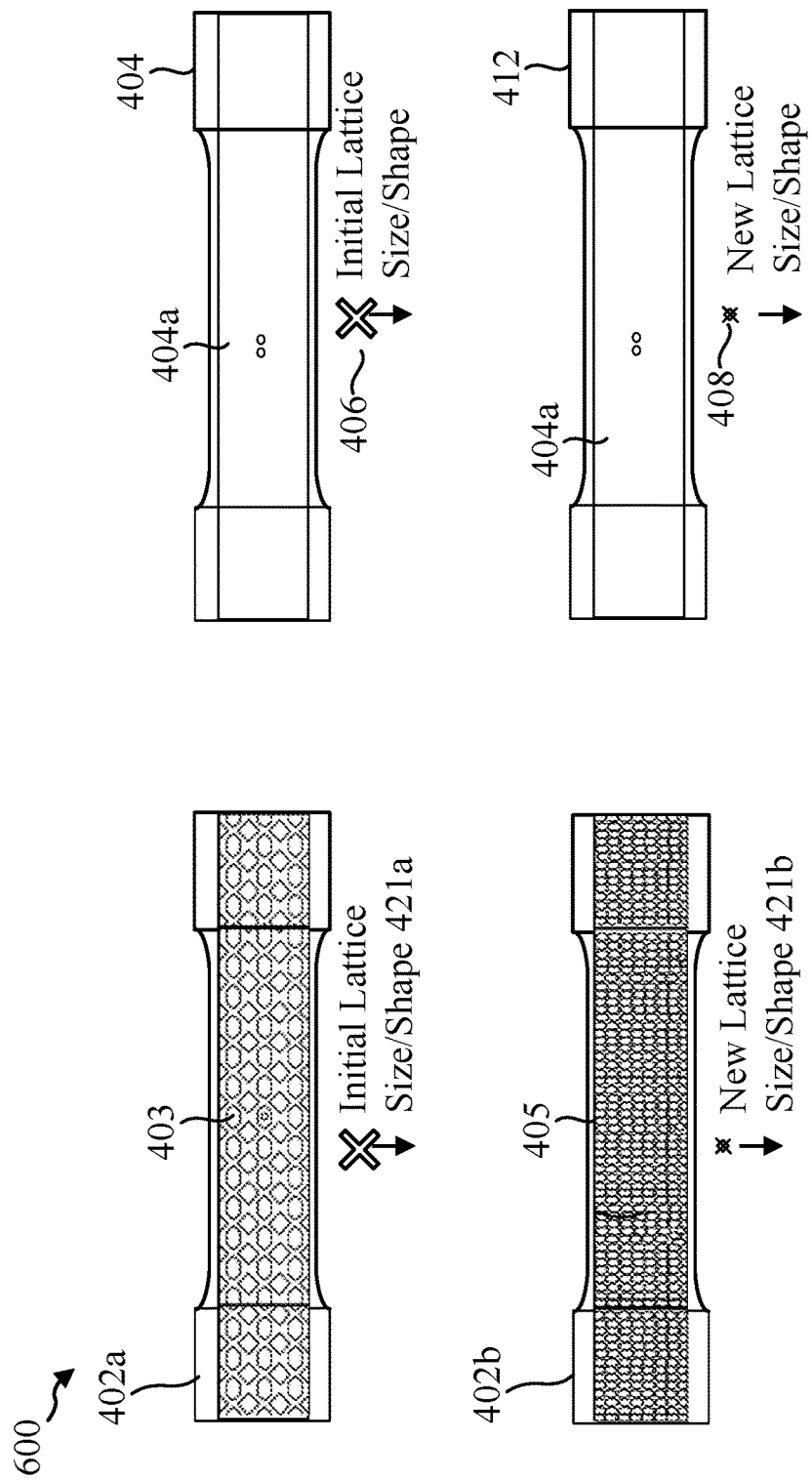
FIG. 4 is a conceptual diagram comparing a conventional technique for rendering a 3-D printed lattice with a parametric technique in which the volume is represented in the CAD model as a solid-body.

FIG. 4 is a conceptual diagram comparing a conventional technique for rendering a 3-D printed lattice with a parametric technique in which the volume is represented in the CAD model as a solid-body. The two tubes 402*a-b* on the left represent the conventional techniques and the two tubes on the right 404 and 412 represent the parametric approach. The structures in FIG. 4 generally relate to whether a relatively sparse lattice structure 403 will be used as in cylinder 402*a* (see the generally magnified initial lattice size/shape 421 directly beneath structure 402*a*) or whether a denser lattice 405 as shown in cylinder 402*b* (see smaller lattice size/shape directly beneath cylinder 402*b*) will be used.

Referring first to the conventional approach, tube 402*a* represents an illustrative tube within a generic component to be printed. Using the CAD, CAM and slice techniques as described in detail above, the manufacturer can design a complex lattice or geometric array, represented as 403 in the illustration. It is assumed that at some point such as prior to or during the initial CAD rendering, the manufacturer is contemplating whether to use a cylinder 402*a* with a sparse lattice 403, or to instead use an otherwise identical cylinder 402*b* with a denser, smaller lattice 405. This decision by the manufacturer can also crop up immediately before the print, or shortly thereafter, when the manufacturer determines that the lattice 403 requires a design modification.

In the first case, where the decision is being determined prior to or during the CAD design, it should be noted that the manufacturer will incorporate either the sparse design 403 or the dense design 405 into the initial CAD file. While the sparse file may require less capacity, both configurations will lead to an increased file size and will result in the limitations encountered in more complex AM designs, above.

In the other case where the density problem is not immediately appreciated during the CAD phase, but instead only comes to light at some time after the CAD model is complete, the manufacturer may realize that the lattice structures 403/421*a* are too large, and that the structures must be made smaller to 405/421*b* to provide adequate strength to the cylinder 402*a-b* to effect its intended purposes. Conventionally, the manufacturer must restart the design process at the CAD stage, modify the lattice structure 403 to create a smaller size or shape 405/421*b*, and then progressively take the cylinder 402 and the software design of the entire component through the various stages until slices are achieved for the cylinder 402*b* that incorporate the new design 405. At the very least, a significant and unavoidable amount of time has been spent as the tube is laboriously rebuilt and the part recompiled. The risks of software errors encountered by the files propagating through the compiling and CAM algorithms are also faced a second time. Assuming no significant errors are encountered, the sliced representation of the tube 402*b* (along with the remainder of the part, if applicable) is 3-D printed with the lattice network 405 having the new size 421*b*.

Referring now to the parametric approach, it is assumed that tube 404 is an identical tube in which, like its counterpart cylinder 402*a* using conventional means, a complex lattice is designated to be placed. It is also assumed, this time for simplicity, that the tube 404 only represents one portion of the part to be printed, as the tube 404 is connected to other structures that will all be 3-D printed as a single part. The initial objective is to 3-D print a larger part including the tube 404 which, in turn, includes an array of lattices 404*a* having a shape 406. Unlike the conventional approach, during the CAD process, the inner portion 404*a* of the cylinder is modeled, e.g., by determining a cylindrical volume with a simple tubular pattern with increased diameters at both ends. The cylindrical volume or cavity 404*a* within the interior of the tube 404—where the lattice will ultimately reside—is modeled, e.g. in a color purple, as a solid volume. Only after the slice pattern is performed and completed is the exposure pattern of the initial lattice 406 parametrically applied as an exposure pattern during the print job. If, however, it is determined that the lattice 406 is too big and that a new exposure pattern corresponding to a new lattice 408 is desired, the parametric print pattern is adjusted slightly to incorporate new parameters, and the new exposure pattern 404*b* with the larger lattice size 408 is simply applied to the same volume 404*a* in the part 412 at any time before the print begins. Thus, for example, the spacing can be changed or the intensity of the beam altered, the positioning of the spots adjusted, etc. to modify the new lattice from size/shape 406 to size/shape 408, without any requirement of an adjustment to the original CAD file.

Figures 5A, 5B:
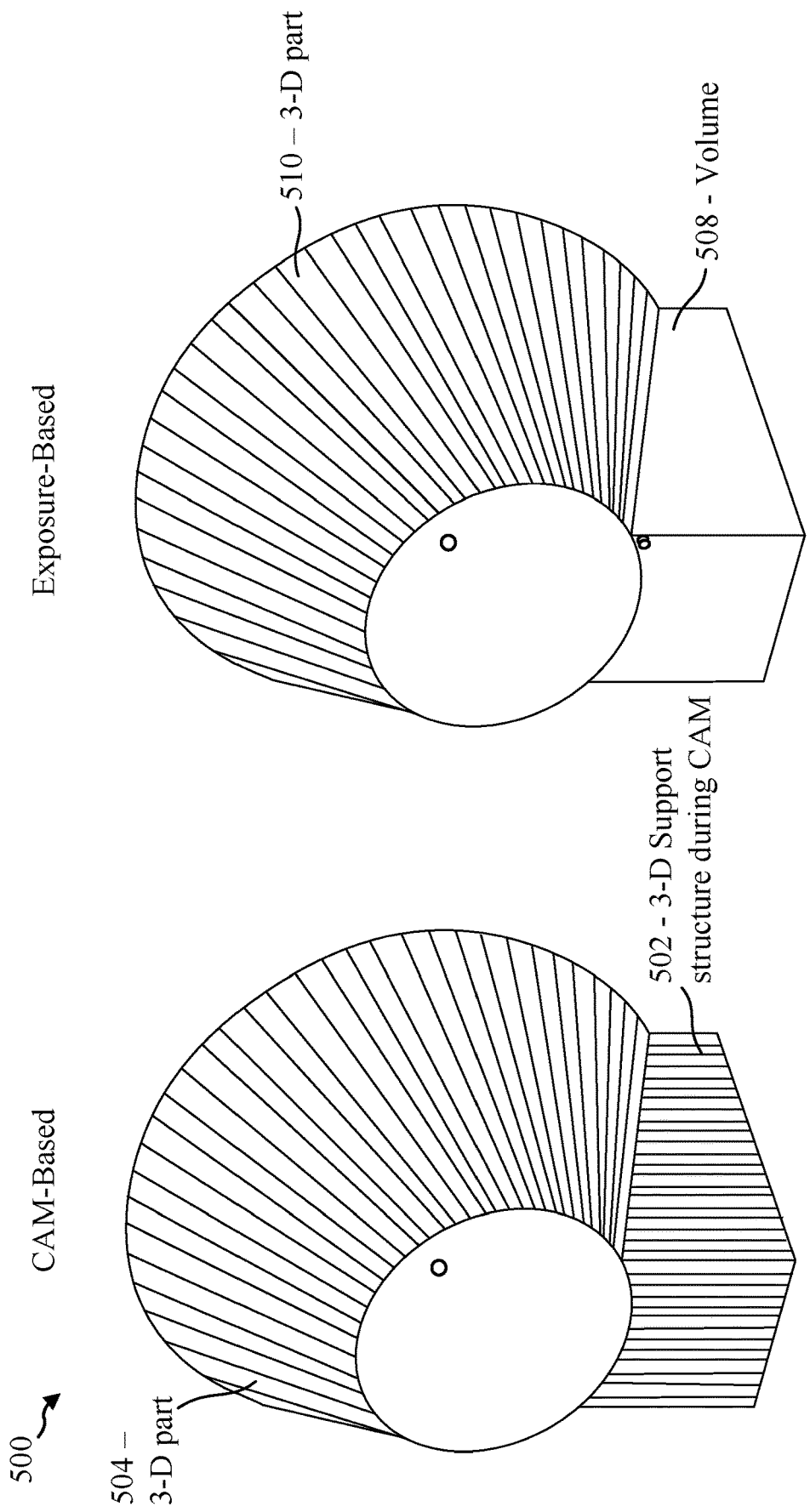
FIGS. 5A and 5B are perspective views of structures 3-D printed with support material modeled using a conventional approach and an exposure-based approach.

In addition to CGFs, the principles of the present disclosure can be used to create support structures. Accordingly, in another embodiment, in lieu of adding support structures using a separate set of algorithms at the CAM stage, support structures may be created using the parametric approach as noted above. FIG. 5A shows an example of a structure 504 that represents a conventional component with certain surface features and with a 3-D CAM model of a support structure 502. FIG. 5B shows an example of a support structure 510 and a simple support model appended as a volume to the 3-D part and designated by a color, or recognized by its shape.

Referring initially to the component 504 on the left, which includes support structure 502 developed using standard CAM-based techniques, the support structure 502 is built into the lower portion of a component 504 having an angle that provides support to structure 504 during the AM process.

Building the support structure 502 into the component 504 to be printed in this manner has disadvantages. For example, the surface selection for the support structures is non-parametric, meaning it is added during the CAM stages as a full 3-D model with all attributes for being connected to the part 504 and rendered during the initial part of the 3-D print stage. As before, the non-parametric surface 502 has all necessary detail and thus a significant file size. The file must be compiled into print instructions prior to the slice stage.

By contrast, the 3-D part 510 on the right uses an exposure-based approach as described herein. Component 510 is 3-D printed part that requires support. Volume 508 is therefore formed. Volume 508 is only characterized by a single geometrical boundary which can meet with component 510, the former with at most a color or number to designate it as a volume for use in support. During the expose stage, the support structure 508 is subsequently rendered to support the part 510 using an exposure pattern in which the energy beam is manipulated in a custom manner, similar to above examples. Like the CGFs herein, the file size is dramatically reduced as a result of the application of the support pattern at the expose stage 107. Further, in the case where part 510 is a lattice or complex structure, the part 510 can also be configured to originate as a parametrically-modeled volume (e.g., a solid body).

In sum, structure 508 can be uniquely designated and subsequently rendered in the 3-D printer using the exposure-based approach to provide the requisite support for a support element without the traditional computational burdens. Where 3-D part 510 requires support during the 3D print, volume 508 can be used for that purpose. The CAM procedure can be bypassed, and the slice software no longer requires large files to be made even larger by the addition of complex support structures. The manufacturer can then streamline the software process into only those routines that are necessary for the parametric based approach, using the same software for both the generation of complex geometric structures and support structures. For example, in one embodiment, CAD, slice, and exposure stages can be integrated into a single software solution, eliminating extraneous file-size requirements and software incompatibilities inherent in the conventional approach.

Figure 6A:
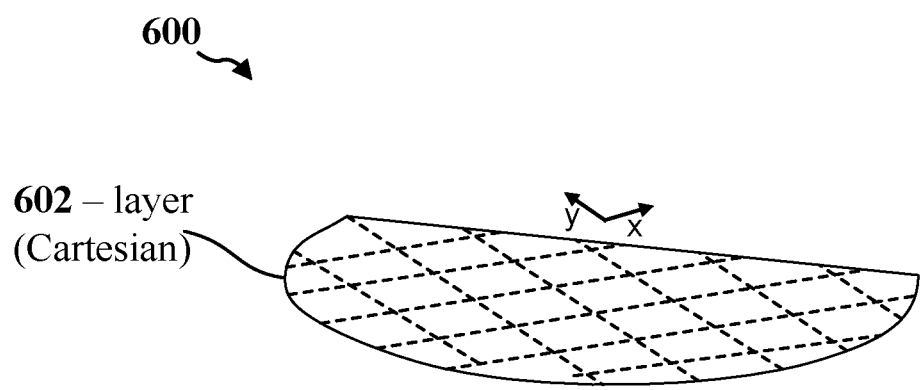
FIGS. 6A-C are conceptual illustrations of cross-sectional slices showing three exemplary techniques to fuse two-dimensional (2-D) modeled structures, including using Cartesian coordinates (FIG. 6A), variable parameters (FIG. 6B) and conformal parameters (FIG. 6C).
Figure 6B:
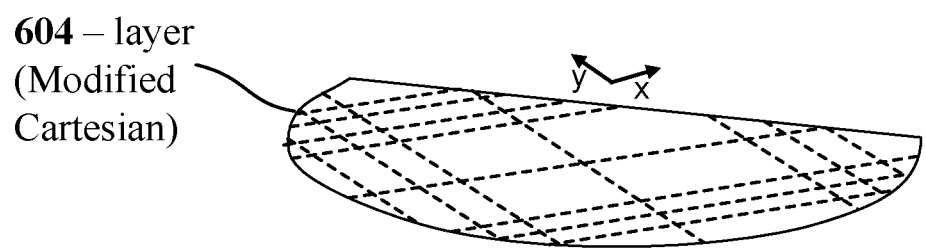
Figure 6C:
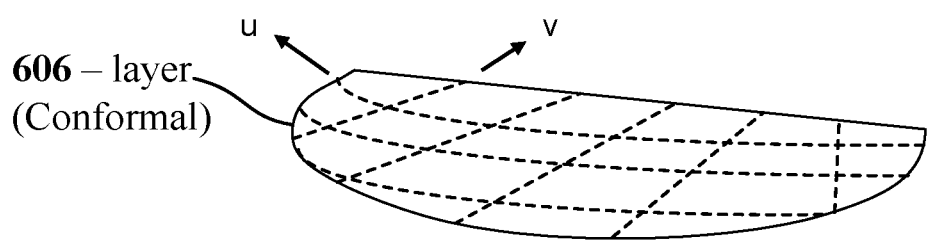

FIG. 6A-C are front perspective views of three sections of a cross-sectional print layer from a 3-D part, each representing a cross-section of a determined parametric volume and each having a pattern of vertical structures created using different exposure patterns. Each of the sections of print layers FIGS. 6A-C represent three examples of the parametric techniques for 3-D printing more complex features.

Referring first to FIG. 6A, a slice of a solid volume 602 is rendered and printed using an instruction such that the spacing on the layer in printed evenly in both x and y dimensions. This is effectively a print using two Cartesian coordinates, as shown on the graph. It should be noted that both the size and the orientation of the coordinates can be adjusted to be optimal for the desired design. In FIG. 6A, the dashed lines represent areas of fused print material. A structure having an evenly distributed interior set of walls may be printed using the Cartesian approach.

FIG. 6B shows an illustration of a cross-sectional layer 604 with a modified Cartesian—variable dimension approach. Here, the parametric instructions are configured to print a set of lines in one direction with a closer spacing (e.g., a higher beam switching frequency) and to print a set of lines in another direction with a further spacing (e.g., same beam "on" time but with longer "off" time and lower switching frequency). This type of contour provides the ability to render different structures that adhere to different physical characteristics such as custom load-bearing structures where the load requirements are greater in one direction than another. The patterns such as that shown in FIG. 6B can be produced by simply amending the beam-switching pattern in the directions to the 3-D printer.

FIG. 6C represents an example of conformal or generative design. The structure in FIG. 6C uses a parametric u-v coordinate system to give a curved effect to the cross-sectional layer 606. u-v mapping is the parametric modeling process of projecting a 2D image to a 3-D model's surface for texture mapping. u-v texturing can be performed by using a matching exposure pattern to precisely render the 3-D printing in the determined volumes for the CGF, e.g., at the end of a print. The layers 606 in FIG. 6C produce a conformal structure, meaning it can preserve the correct angles between directions within small areas. FIG. 6C can also create a sparse lattice. Generative design is historically extremely difficult on CAD systems. One significant benefit of the parametric approach is that it removes the difficulties of generative design from the ambit of CAD. Instead, parametric modeling using a conformal coordinate system can be substituted for 3-D modeling using CAD.

As FIG. 6C demonstrates, the parametric approach can advantageously be limited to two coordinate dimensions. However, it is not limited to an x-y coordinate system, and with a conformal approach parametric modeling can have wide application. The approach can be utilized to generate variable density lattices, fins, or iso-grids by defining a characteristic dimension function in the parameter itself upon manipulation of the laser or energy beam during exposure. The u-v coordinate system can be curved to match the curvature of the cross-section, thereby retaining the desired angles, for example.

Figure 7:
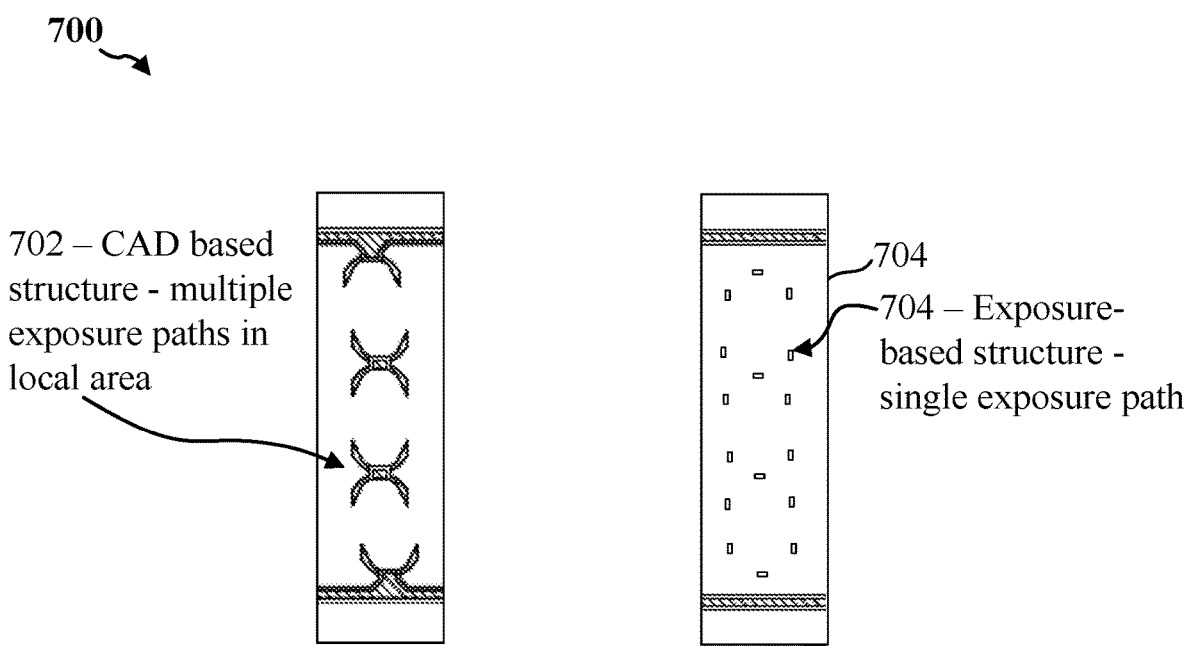
FIG. 7 is a diagram of a structure using multiple exposure paths in a CAD-based AM technique and a contrasting diagram of a structure using a single exposure path in an exposure-based AM technique.

FIG. 7 shows an illustration 700 of a CAD-based structure versus an exposure-based structure. With the parametric approach, the quality and integrity of the parts can be improved. For example, in conventional CAD-based approaches such as the structure 702, multiple exposure paths in a localized region can compromise the build and the material properties of the part. It can also lead to larger wall thicknesses than necessary. By contrast, with the parametric approach as illustrated by the structure 704, single exposure paths can be used that reduce the risk to quality without requiring as much material to be printed, reducing complexity. In addition, minimal wall thicknesses can still be used that remain sufficient to provide the needed support using the parametric approach.

Parametric approaches also eliminate or substantially reduce problems with changing the print orientation. FIG. 8 is a conceptual diagram of a component undergoing a change to a new orientation and an orientation of lattice elements within the component. As the lattice design is generated in the exposure stage through parameters, the lattice elements need not be remodeled in the CAD stage in the event the print orientation is changed. That is, in FIG. 8, if it is determined at the last minute prior to printing part 802a that the build orientation of part 802a should be changed by a 45° angle, the internal portion of lattice elements 865(1) in 802a need not be changed to accommodate the new elements in 802b. That is, even if part 802a is rotated in a revised CAD model by 45 degrees and the modeled result is 802b, the array of lattice elements can still be printed parametrically in exactly the same orientation. This represents an improvement over the conventional approach, in which a rotation of part 802a to the orientation of part 802b would require that the entire lattice structure within the part be re-oriented as well, and the CAD process flow repeated from the beginning for all structures, including the CGFs.

Figure 9:
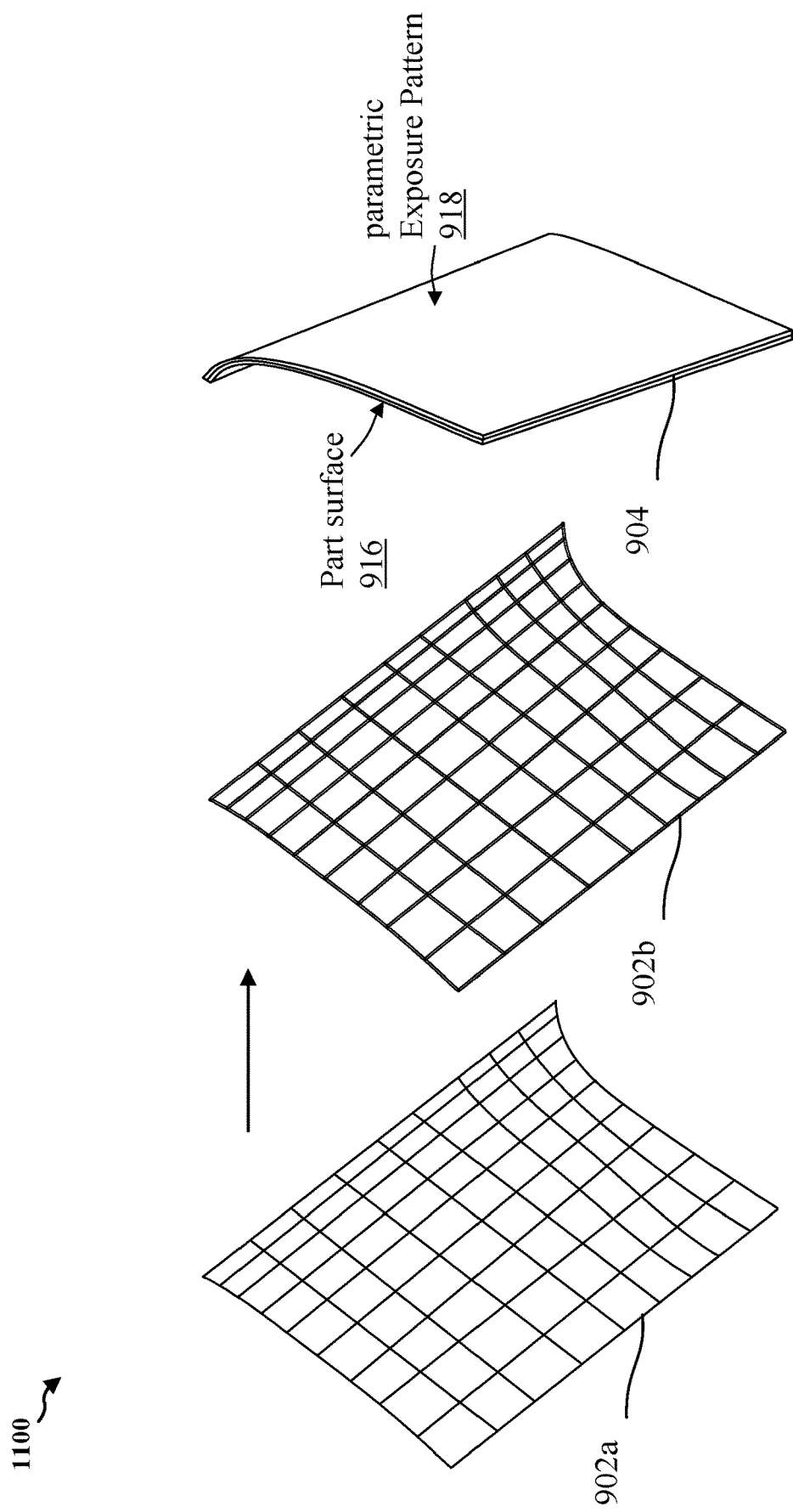
FIG. 9 is a set of perspective views of structures for comparing cross-sections of 3-D printed material using conventional and exposure based approaches.

FIG. 9 is a set of perspective views of structures for comparing cross-sections of 3-D printed material using respective conventional and exposure based approaches. Referring first to the CAD-based modelling 902a-b, the detailed modeling of the complex parts, or geometries with periodic, semi-periodic or random patterns can be extensive and can involve multiple layers 902a and 902b of such patterns. Parametric approaches such as shown in 904 illustrate that the part surface 916 is instead covered with a layer representing a solid body which can be manipulated at the print stage to include parts that have parametric patterns 918 such as the ribbed/iso-grid characteristics of the CAD design in layers 902a and 902b but without the time and file size constraints.

Figure 10:
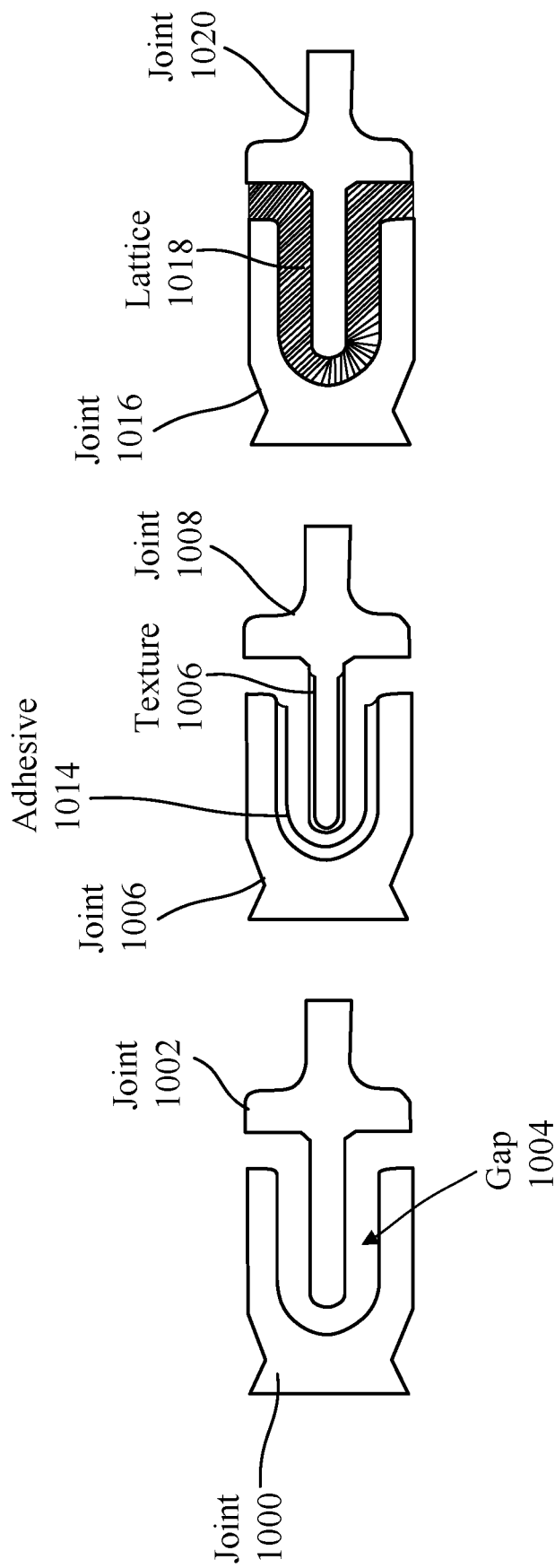
FIGS. 10A-C are conceptual diagrams illustrations forming joints using conventional, textured, and lattice-based techniques.

Parametric approaches can also have applicability in an embodiment involving joining members using adhesives for vehicle parts and other mechanical structures. FIG. 10A shows an example of a current joint scheme for joining structures. Reference is first made to FIG. 10A. In 3-D printing joints 1000 and 1002 using the conventional techniques, a relatively large gap 1004 may be needed to accommodate both tolerance stack-ups from different tolerance variations that may aggregate in the CAD model and the requirement that contact be avoided, e.g., to avoid galvanic corrosions. FIG. 10B shows an alternative technique using a textured joint. Texturing at joints 1006 acts as rebar for the adhesive 1014, thereby increasing bond strength and reducing the required joint area. FIG. 10C shows a lattice joint scheme. Using a lattice at the joints (e.g., via a parametric-based approach by identifying a volume between the joints) allows for compliant assembly and cross-linking, increasing bond strength and reducing the joint gap.

In the embodiments discussed herein, the approach contemplates using a solid body to specify a region. This information is indicative to the 3-D printer that something will be printed in the region. This is in contrast to the scenario where the solid body is left unfilled, which may give rise to the problem that the 3-D printer's software will deduce that nothing should be printed in that region and will potentially skip fusing the region altogether. However, it will be appreciated that software is constantly evolving, and in different 3-D printers and/or subsequent implementations, it may not be necessary to designate a solid body. For example, it may be sufficient to designate a region for subsequent customization by the 3-D printer using a future technique. Such techniques are deemed to fall within the scope of the present disclosure.

Figure 11:
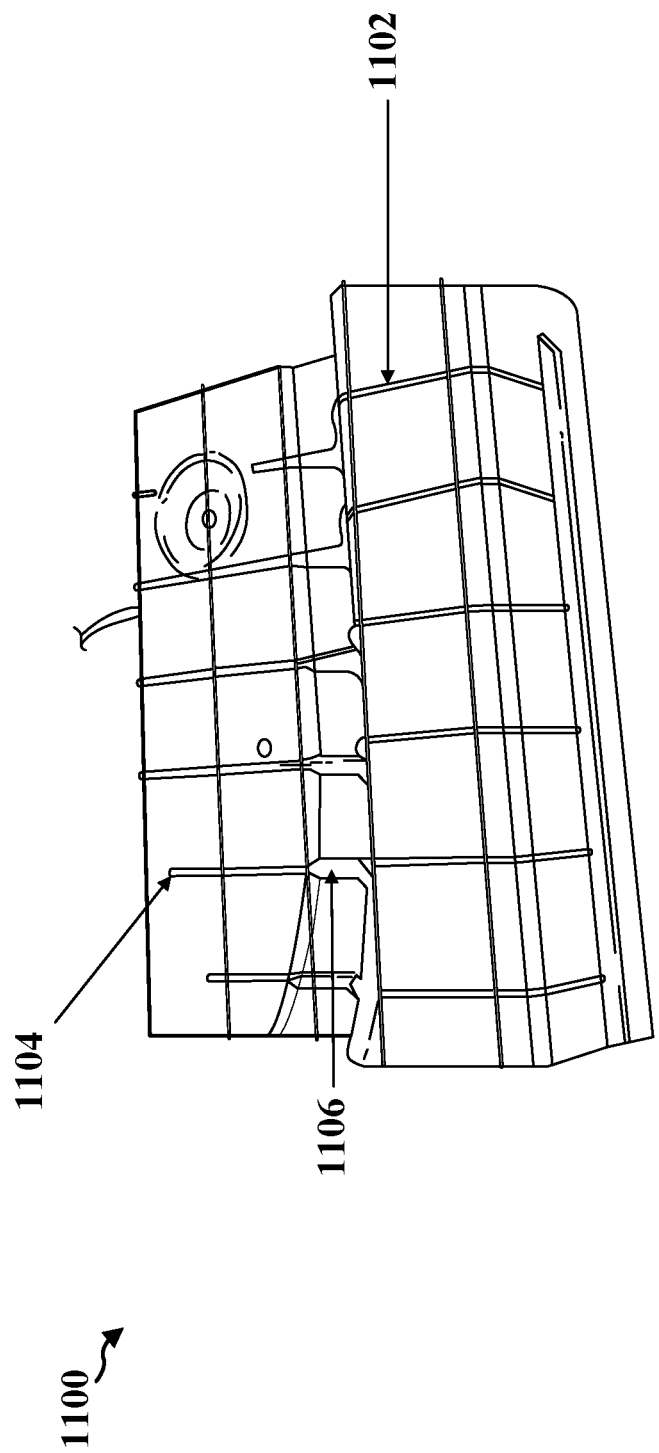
FIG. 11 is a perspective view of a 3-D printed component with a rib-structure produced using an expose-based technique.

An example of such a 3-D printed structure is shown in FIG. 11. FIG. 11 is a perspective view of a 3-D printed component 1100 with a rib-structure produced using a parametric modeling. During the initial CAD modeling of this structure, the area where the ribs 1102 are now laid down was represented by a layer of solid material to form a flat volume. Prior to 3-D printing, the CAD file was sliced, with the flat volume representing a body of material. Following CAM and slice procedures, a set of instructions may be provided to the printer. For the slices corresponding to the flat volume above the component, the energy beam was directed to turn on briefly to fuse the ribs and then off for a longer period of time to achieve a given spacing and to produce a specified number of ribs. After the printer fuses the area including the lines, another layer is deposited by the printer and the process is repeated. After the specified number of layers are deposited, the result is a 3-D printed component that includes a plurality of ribs 1102 required for support.

The component in FIG. 11 can include additional features generated by simple instructions that manipulate the energy beam. For example, the height of walls 1106 can be increased over the height of the rib protrusions 1104 because the volume was shaped to accommodate the increased height when the volume was modeled into the CAD model. In another embodiment, the dynamic nature of parametric modeling allows for additional layers to be dynamically fused at the end of the initial 3-D printing, which may be a more efficient solution than pre-designating the height of the ribs in the CAD model. Whether the instructions are dynamically modified as described, or based on the shape of the parametric volume in the original CAD model, the result is that the 3-D printer can deposit more layers and can then concentrate the fusing process to only a small area within the layer corresponding to each of the ribs. Thus, for example, the energy beam can briefly turn on to fuse a narrow strip of additional material over specified portions of the component, and then turn off until the fusing step is again required for the next rib portion.

Similarly, using simple commands, the energy beam can make the ribs longer or shorter across a lateral direction of the 3-D part. For example, the rib 1104 may be programmed to turn off the energy beam just short of the border of the 3-D part to give the rib 1104 its position near the edge, but not at the edge, of the part. This is easily accomplished by keeping the energy beam off in regions between the end of rib 1106 and the border of the part.

The component of FIG. 11 also illustrates that, after the fusing process is complete, ribs can be generated on the surface of the component in both vertical and horizontal directions relative to the surface (e.g., 1102 vs. 1104). The ribs can be used to stiffen the part. Unlike as done conventionally, the ribs in this embodiment can be created without ever modeling them in three-dimensional space, as is necessary in a CAD program. In an embodiment, rib geometry can be altogether eliminated from the CAD image. As noted above, the 3-D space where the ribs ultimately will reside is simply modeled as a solid flat volume of material.

Further, because the parametric modeling of the ribs can be generated as the last step before 3-D printing or even during the printing, the design can be modified and optimized without having to return to the original CAD file. Design modifications can be effected, for example, by simply changing the spacing of the ribs. Another advantage of the technique is that, if the manufacturer decides that additional ribs with different characteristics are needed for the next versions of the same part to be printed, the levers can be adjusted accordingly to effect this change on future components without the need to make any changes to the CAD image file.

In another embodiment, a section of a heat exchanger is modeled in CAD. The heat exchanger boundary may be identified, e.g., by a volume with a gray color or other indicator. Within the heat exchanger resides a complex array of fins. Instead of inserting one of any number of fins in a region of the heat exchanger, a giant solid block is inserted in that region, which is a marker indicative of a solid body. Later, during the expose portion of the 3-D print stage, fins, tubes, or other redundant portions of the heat exchanger can easily be performed using parametric modeling. If the manufacturer changes the design to double the number of fins, for example, the manufacturer in some embodiments may simply be required to halve the spacing between the fused regions.

Figure 12:
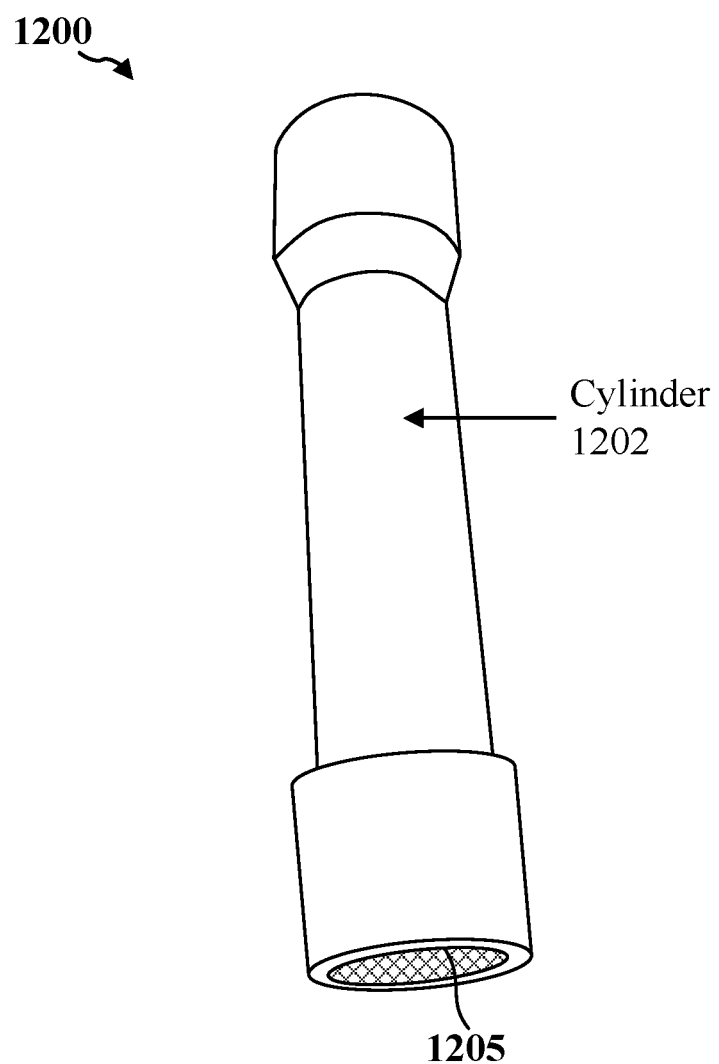
FIG. 12 is an illustration of an aluminum cylinder with a lattice rendered within.

FIG. 12 is an illustration of a 3-D part including an aluminum cylinder 1202 with a lattice 1205 rendered within. In this embodiment, during the CAD modeling of the component, a volume for a lattice area 1205 in the shape of a tube with a diameter can be specified as a solid block of material. It is anticipated that the necessary lattice model will be added at the last step of the design process by modulating the appropriate levers. For example, when the model has been sliced and is at the material development stage right before the 3-D print, the manufacturer can change one or more levers in the solid block of material such that the lattice 1205 with the desired parameters will be 3-D printed in the vacant tube. Additionally, if it is determined that a greater or fewer number of ribs or lattice structures is desirable, those changes can be made in a straightforward manner simply by changing the necessary parameters.

The manipulation of the component at the last step, as described above, has additional advantages. Oftentimes it is unclear how it is best to orient a print structure in 3-D space in a powder bed until near the end of the process. During a conventional process, it is difficult or impossible to make such changes without significant and time-consuming file edits. As described above, when complex features are already modeled into the structure, turning or orienting the structure relative to the print bed even slightly may cause the complex structures to sag, e.g., due to a lack of support material.

Another advantage of the present disclosure is that the generic nature of the CAD file and subsequent CAM and slice files may help preserve corporate confidentiality with respect to structures embodied in the solid volumes. The documents may include one or more regions in which a solid region (as above) is so designated. The CAD design model and subsequent files include the 3-D part model only with the solid regions or volumes pre-designated (as opposed to the potentially proprietary structures within those regions). Only at the last step is it necessary to load a file containing the instructions to the 3-D printer as to what the laser will do on the cross-sectional layers corresponding to these regions.

Another advantage of the current approach is that in the CAD software, the manufacturer will typically model the part as a 3-D part in an X-Y-Z coordinate system. By contrast, using the present approach, the lattice structure or other complex element can be modeled per slice, i.e., in individual layers. This concept is consistent with the principles of FIG. 3, above, where the different individual slices show how the model changes per layer. The layer-by-layer design of the lattice reduces the computational intensity of the process. The part is subsequently printed by being subject to the exposure pattern on a layer by layer basis. This approach is distinct from the left portion of FIG. 4, for example, where the CGF is designed in three dimensions using the CAD software. Eliminating the requirement to model the CGF(s) in three dimensions can render the file size an order of magnitude smaller, for example. If multiple CGFs are used on a 3-D part, this complexity builds up dramatically. Thus, using the benefits of the current approach for a part with multiple CGFs is that much more apparent, since the size reduction to the CAD file can be that much more conspicuous when the print is complete.

The parametric-based approach can also take advantage of the specific printer and the number, features, and spacing of the one or more energy beams to create unique profiles and geometries that ordinarily are not achievable if the features are pre-included in the CAD files. As one example, the user may be able to obtain a lattice using much smaller and thinner walls, which can result in a part that is very lightweight yet strong.

Figure 13:
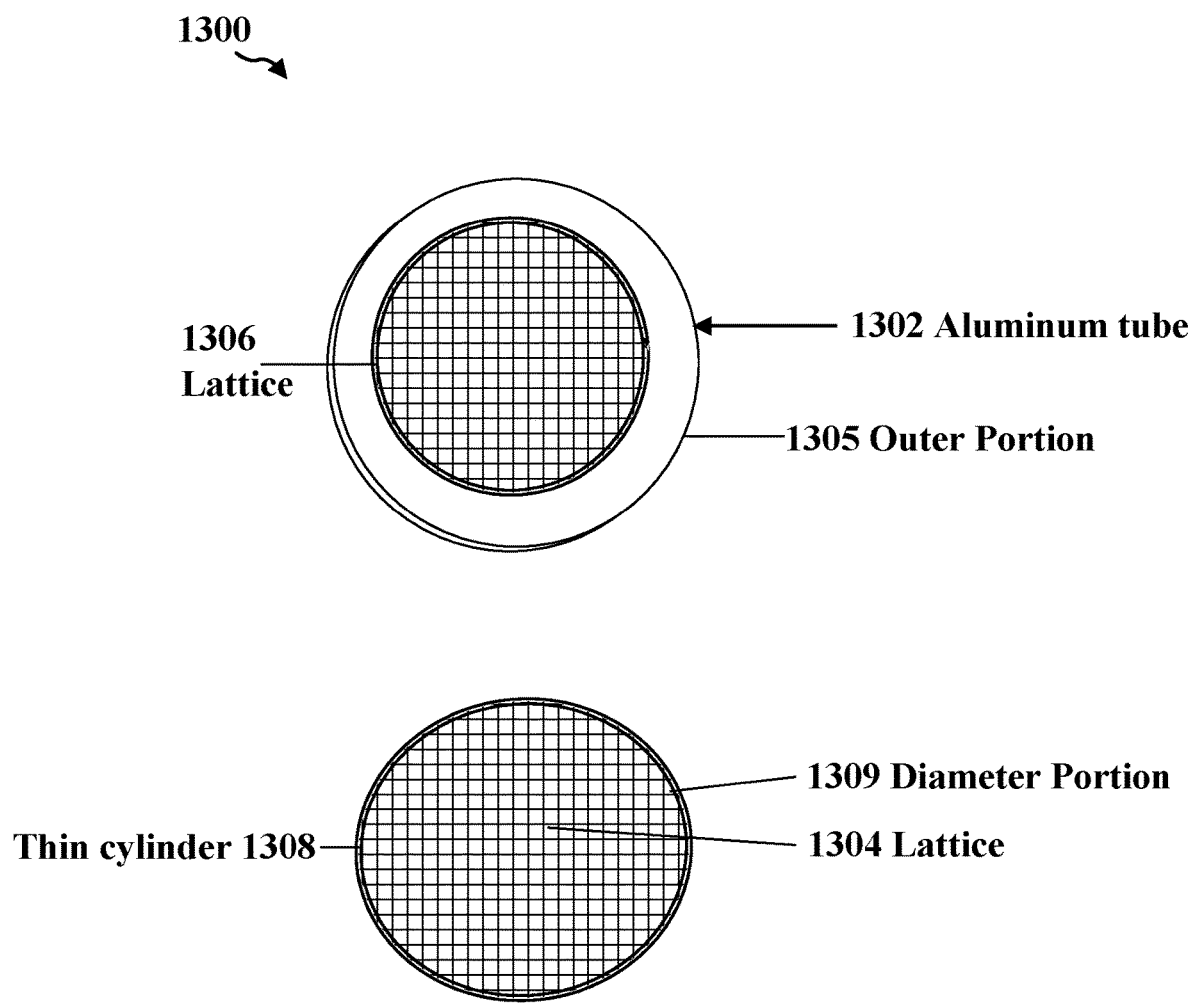
FIG. 13 is an illustration of upper portions of two aluminum tubes, one CAD-based and one based on a parametric approach using a unique structure not capable of being produced conventionally in the 3-D printer.

An illustration of an upper portion of an aluminum tube (i.e., looking down into the tubes) is shown in FIG. 13. The structure 1302 may be created using the conventional approach using CAD→CAM→Slice→Print+Expose. Due to limitations in the CAD modeling software and the software used to render the 3-D part, or both, the outer portion or diameter 1305 of the cylinder likely has limitations in how small the structure can be printed. In addition, similar limitations may apply to the lattice 1306 when generated using the conventional approach. In sum, these software limitations can result in a CGF that was larger than it needed to be to accomplish its functions and to do so in a reliable manner.

By contrast, a lower portion of an illustration of a cylinder 1308 using the parametric approach is shown in the lower portion of FIG. 13. The lower cylinder may be formed based on a parametric approach using a unique structure 1308 not capable of being produced conventionally in the 3-D printer.

As is evident from the illustration, a designer can construct a tube having a diameter 1309 that, while preserving the necessary strength, can be much thinner than the diameter 1305 of the conventional approach. This physical feature can be advantageous in cases where less mass or less volume, or both, are necessary in view of the application. Moreover, using an embodiment of the present disclosure, a designer can achieve a lattice structure 1308 that is smaller, thinner, and more closely spaced than may otherwise be achievable using the traditional approach.

By manipulating the energy beam in customized ways, the manufacture can achieve a more precise and higher quality component that is otherwise achievable using the CAD-based approach. The thinner walls are a result of the software using less energy, and smaller, finer more granular structures. The CAD-based approach, by contrast, tends to use a significant amount of energy that penetrates struts and walls, making the struts thicker than necessary to provide the requisite support for many applications. Using the exposure based approach, the manufacturer has more control over fine-tuning the energy-beam and hence making finer modifications to the structures. Further, the manufacturer can use much less energy in rendering these structures. As one example, a manufacturer can make the struts (and thus the overall wall) thinner while retaining the integrity of the part, which is often difficult to achieve with conventional 3-D printers. By the same token, the manufacturer retains control in that even using the exposure based approach, it can specify thicker struts, walls and other structures as they are needed, using beam spacing and intensity modifications.

In addition, where a strut meets a wall in a CAD-based design, the high energy caused by the meeting of the parts tends to create stress concentrations, leading to potential failure locations. Because the exposure-based approach can render the walls and struts to be thinner, the risk of failure at those locations is reduced significantly. In addition, the size of the strut can be made significantly smaller than that of a wall using the exposure-based approach, meaning that damage to the strut will likely not cause damage to the wall.

More generally, the present approach provides a holistic ability for the 3-D print manufacturer to maintain a library of in-house algorithms based on parametric designs for providing different types of solid bodies to the initial image file. For example, in the case of support structures, it may be possible to forego or skip the entire support structure generation step in CAM. This means that the designer is no longer relegated to using the very-specific software algorithms to accomplish support generation, for example. In lieu of using these potentially disparate software packages to create large and unwieldy files to merge support structure information into the slices, the entire solid-body software solution discussed herein can be streamlined to apply to different applications within the CAD, CAM and slice generation steps. In particular, the manufacturer can use one aspect of the solid-body approach to generate the support structures. This means, for example, that the manufacturer can simply draw in the support structures as solid bodies during the initial CAD file generation wherever overhang is present. The manufacturer can thereupon apply the appropriate exposure patterns to generate the support structures. Thus, as an example, a manufacturer can develop and own in-house, the design, support generation, and 3-D printing software suite of algorithms. Such an integrated suite of algorithms can be dramatically improved over time to work in concert, mitigate or minimize errors, and correct data corruption issues.

In another embodiment noted above, the parametric-based approach can open new opportunities in generative design. The approach can be adapted, for example, to create 2-D maps of contours to define a part cross-section. It was noted above that in typical 3-D printer rendering a 3-D part under the control of a standard set of instructions generated from a CAD design model, the energy beams are configured to fuse structures in three-dimensional space. Conformal patterns are now possible to generate these contours.

In some alternative embodiments, it may be desirable to print the lattice or other CGF without it being accompanied by a separate part or print structure. For example, it may be desirable to print a separate lattice or other structure without the accompanying 3-D printed part, so that the manufacturer can take advantages of the principles of this disclosure without necessarily generating a separate 3-D part on every occasion. As a simple example, the manufacturer may dedicate one printer to quickly printing complex geometric parts, while allowing other printers to print more traditional 3-D parts. Still other 3-D printers may be configured to use the hybrid approach described herein in which the 3-D part or build piece is generated with one or more CGFs. Nonetheless, some embodiments may favor the manufacturer using the 3-D printer, at least some of the time, for generating CGFs without the 3-D printed part.

In an embodiment for accomplishing this task, reference is again made to FIG. 4 and in particular the lower right structure 412. A CAD software program may be used for the purpose of generating a body (e.g., the external cylinder 412 of 404a or any other suitable external body) within which to hold a complex lattice. The body, such as the single cylinder 404, 412 demonstrated in FIG. 4, may be sliced to a very simple external CAD structure. Thereupon, the manufacturer can easily control the creation of the lattice or CGF within the body by turning the energy beam source on and off as otherwise described herein. The result is the lattice that can be produced and removed from the printer, and thereafter can be for any purpose, such as for interfacing with commercial-off-the-shelf ("COTS") parts or custom parts not printed using the printer.

In a similar embodiment, the manufacturer may simply model a solid body of any size for use as a basis for creating a CGF. While the solid body may be generated using CAD software and the CGF thereafter generated as described herein, in some embodiments, it may be possible to remove the CAD model altogether, depending on printer capability, and to manipulate the energy beam source to produce the CGF directly without need for a separate CAD model. For example, if a 3-D printer can be self-configured (or configured through local software) to deposit successive layers, then the manufacture can manipulate a local energy source (or a plurality thereof) to create a lattice or CGF without requiring a 3-D printed part.

Figure 14:
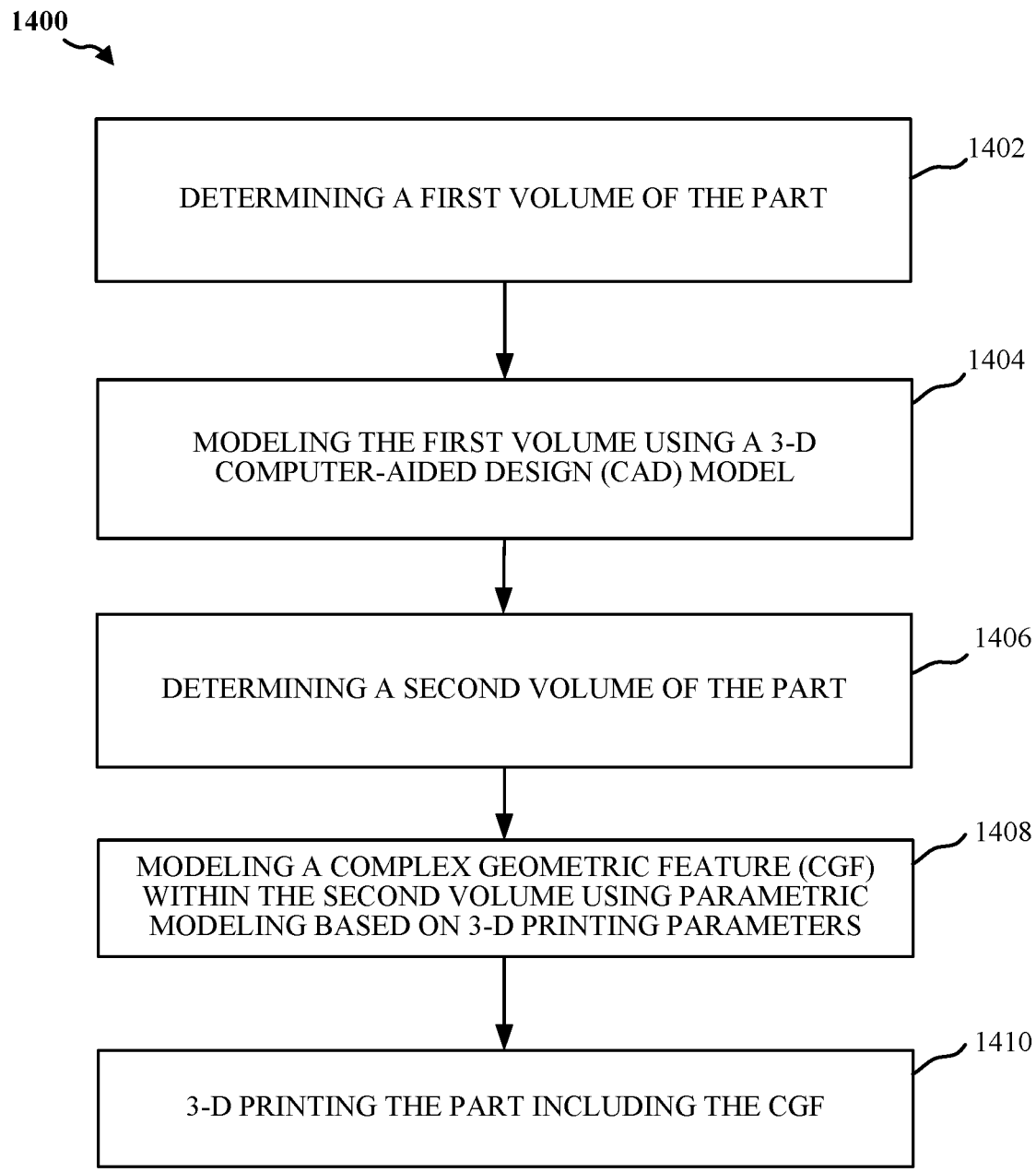
FIG. 14 is a flow diagram of an exemplary method for 3-D printing.

FIG. 14 is an exemplary flowchart of a method for using parametric modeling in 3-D printing according to an embodiment. At step 1402, a first volume of a 3-D part may be determined. At step 1404, the first volume may be modeled using a 3-D CAD model. At step 1406, a second volume of the part may be determined. At step 1408, a CGF may be modeled within the second volume using a parametric model based on 3-D printing parameters. These may include various aspects of the energy beam source, for example. At step 1410, the part is printed including the CGF.

The previous description is provided to enable any person skilled in the art to practice the various aspects herein. Various modifications to the exemplary embodiments presented throughout this disclosure will be readily apparent to those skilled in the art, and the concepts disclosed herein may be applied to other objects and concepts. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A method of modeling a part for 3-D printing, the method comprising:
   determining a first volume of the part;
   modeling the first volume using a 3-D computer-aided design (CAD) model;
   determining a second volume of the part;
   modeling a complex geometric feature (CGF) within the second volume using parametric modeling based on 3-D printing parameters, wherein the CAD model of the first volume and the parametric model of the CGF are independently compiled and not constrained by one another; and
   determining independent instructions for 3-D printing portions of the part based on separate processing of the CAD model of the first volume and the parametric model of the CGF during 3-D printing of the part.

2. The method of claim 1, further comprising:
   executing the instructions for 3-D printing the part, wherein the CGF is printed layer-by-layer, the instructions directing an energy beam source in a 3-D printer to successively fuse material of each layer corresponding to a cross-section of the CGF until the CGF is complete.

3. The method of claim 1, further comprising:
   executing the instructions for 3-D printing in a powder bed fusion (PBF) printer.

4. The method of claim 1, wherein modeling the CGF includes obtaining a predetermined set of 3-D printing parameters from a database.

5. The method of claim 4, wherein the set of 3-D printing parameters includes at least a beam speed, a beam on/off timing, a beam switching frequency, beam intensity, or a beam spacing.

6. The method of claim 1, wherein the CGF includes at least a lattice structure or a heat exchanger structure.

7. The method of claim 1, wherein the CGF includes a support structure for a portion of the part in the first volume.

8. The method of claim 1, wherein the CGF includes one or more complex geometries including a periodic geometry or a random geometry.

9. The method of claim 1, further comprising:
   storing the CAD model in a separate file from the parametric model.

10. The method of claim 1, wherein the parametric modeling includes providing instructions for applying a single parameter of an energy beam to each layer within the second volume.

11. The method of claim 1, wherein the parametric modeling includes providing instructions for applying an exposure pattern of an energy beam to render at least a portion of the CGF.

12. The method of claim 11, wherein applying the exposure pattern includes fusing a region in each layer of a plurality of consecutive layers in the second volume and aligning the fused regions to form a three-dimensional structure in the CGF.

13. The method of claim 1, wherein the 3-D printing parameters include a conformal pattern.

14. A non-transitory computer-readable storage medium storing computer-executable instructions for modeling a part for 3-D printing, the instructions comprising code for:
   determining a first volume of the part;
   modeling the first volume using a 3-D computer-aided design (CAD) model;
   determining a second volume of the part;
   modeling a complex geometric feature (CGF) within the second volume using parametric modeling based on 3-D printing parameters, wherein the CAD model of the first volume and the parametric model of the CGF are independently compiled and not constrained by one another; and
   determining independent portions of the instructions for 3-D printing portions of the part based on separate processing of the CAD model of the first volume and the parametric model of the CGF during 3-D printing of the part.

15. The computer-readable storage medium of claim 14, wherein the code for the CAD model is included in one or more files different from the code for the parametric model.

16. The computer-readable storage medium of claim 14, further comprising code for:
   executing the instructions for 3-D printing the part with the CGF, wherein the CGF is printed layer-by-layer, the instructions directing an energy beam source in a 3-D printer to successively fuse material of each layer corresponding to a cross-section of the CGF until the CGF is complete.

17. The computer-readable storage medium of claim 14, further comprising code for:
   executing the instructions for 3-D printing in a powder bed fusion (PBF) printer.

18. The computer-readable storage medium of claim 14, wherein the code for modeling the CGF includes obtaining a predetermined set of 3-D printing parameters from a database.

19. The computer-readable storage medium of claim 18, wherein the set of 3-D printing parameters includes at least a beam speed, a beam on/off timing, a beam switching frequency, beam intensity, or a beam spacing.

20. The computer-readable storage medium of claim 14, wherein the CGF includes at least a lattice structure or a heat exchanger structure.

21. The computer-readable storage medium of claim 14, wherein the CGF includes a support structure for a portion of the part in the first volume.

22. The computer-readable storage medium of claim 14, wherein the CGF includes one or more complex geometries including a periodic geometry or a random geometry.

23. The computer-readable storage medium of claim 14, wherein the code for parametric modeling includes applying a single parameter of an energy beam to each layer within the second volume.

24. The computer-readable storage medium of claim 14, wherein the code for parametric modeling includes applying an exposure pattern of an energy beam to render at least a portion of the CGF.

25. The computer-readable storage medium of claim 24, wherein applying the exposure pattern includes fusing a region in each layer of a plurality of consecutive layers in the second volume and aligning the fused regions to form a three-dimensional structure in the CGF.

26. The computer-readable storage medium of claim 14, wherein the 3-D printing parameters include a conformal pattern.

\* \* \* \* \*